(12) United States Patent
Sanghavi et al.

(10) Patent No.: US 11,715,144 B2
(45) Date of Patent: Aug. 1, 2023

(54) DYNAMIC RANKING OF RECOMMENDATION PAIRINGS

(71) Applicant: Salesforce, Inc., San Francisco, CA (US)

(72) Inventors: Tejas Sanghavi, San Francisco, CA (US); Marco Casalaina, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 1012 days.

(21) Appl. No.: 16/421,524

(22) Filed: May 24, 2019

(65) Prior Publication Data
US 2020/0372561 A1 Nov. 26, 2020

(51) Int. Cl.
*G06Q 30/00* (2023.01)
*G06Q 30/0601* (2023.01)
*G06N 5/046* (2023.01)
*G06F 16/2457* (2019.01)

(52) U.S. Cl.
CPC ... *G06Q 30/0631* (2013.01); *G06F 16/24578* (2019.01); *G06N 5/046* (2013.01)

(58) Field of Classification Search
CPC .......... G06Q 30/0631; G06F 16/24578; G06N 5/046
See application file for complete search history.

(56) References Cited

U.S. PATENT DOCUMENTS

| | | | |
|---|---|---|---|
| 5,615,109 A * | 3/1997 | Eder | G06Q 10/0631 705/7.12 |
| 7,568,155 B1 | 7/2009 | Axe et al. | |
| 8,359,647 B1 | 1/2013 | Casalaina et al. | |
| 8,521,571 B1 | 8/2013 | Fischer et al. | |
| 8,693,649 B2 | 4/2014 | Casalaina et al. | |
| 8,718,241 B2 | 5/2014 | Casalaina et al. | |
| 8,732,088 B2 | 5/2014 | Casalaina et al. | |
| 8,745,272 B2 | 6/2014 | Casalaina et al. | |

(Continued)

OTHER PUBLICATIONS

"A Two Stage Classification Model for Call Center Purchase Prediction," Shuang, Kai; Ding, Kai-Ze; Liu, Xi-Hao; Wen, Xiao-Le. TELKOMNIKA15.1: 351-356. Ahmad Dahlan University. (Mar. 2017).*

(Continued)

*Primary Examiner* — Robert M Pond
(74) *Attorney, Agent, or Firm* — Kwan & Olynick LLP

(57) ABSTRACT

A prediction model in a database system may be configured to predict, for a given object instance, a respective probability of acceptance for each of a plurality of recommendations. A determination may be made as to whether the prediction model is associated with sufficient training data to produce predictions at a designated accuracy rate. When it is determined that the prediction model is not associated with sufficient training data, for each of a first set of object instances a respective first message may be sent that includes a respective first one of the recommendations determined based on a static ranking rule applying one or more criteria to one or more object fields associated with the respective object instance. The prediction model may be updated to include additional training data based on a plurality of responses corresponding to a respective first one of the recommendations.

20 Claims, 18 Drawing Sheets

(56) References Cited

U.S. PATENT DOCUMENTS

| | | | |
|---|---|---|---|
| 8,751,402 | B2 | 6/2014 | Casalaina et al. |
| 8,762,281 | B2 | 6/2014 | Casalaina et al. |
| 8,769,416 | B2 | 7/2014 | Casalaina et al. |
| 8,775,315 | B2 | 7/2014 | Casalaina et al. |
| 8,782,785 | B2 | 7/2014 | Casalaina et al. |
| 8,914,539 | B2 | 12/2014 | Casalaina et al. |
| 8,984,409 | B2 | 3/2015 | Casalaina et al. |
| 9,047,479 | B1 | 6/2015 | Tsai et al. |
| 9,053,132 | B2 | 6/2015 | Tsai et al. |
| 9,152,658 | B2 | 10/2015 | Tsai et al. |
| 9,201,907 | B2 | 12/2015 | Tsai et al. |
| 9,230,224 | B2 | 1/2016 | Ramsey et al. |
| 9,419,863 | B2 | 8/2016 | Casalaina et al. |
| 9,824,102 | B2 | 11/2017 | Tsai et al. |
| 9,830,054 | B2 | 11/2017 | Casalaina et al. |
| 9,971,482 | B2 | 5/2018 | Casalaina et al. |
| 10,013,654 | B1* | 7/2018 | Levy .................. G06N 3/045 |
| 10,101,883 | B2 | 10/2018 | Casalaina et al. |
| 11,392,829 | B1* | 7/2022 | Pool ..................... G06N 3/08 |
| 2009/0234710 | A1 | 9/2009 | Belgaied Hassine |
| 2010/0192067 | A1 | 7/2010 | Casalaina |
| 2011/0282907 | A1 | 11/2011 | Ramsey et al. |
| 2012/0066065 | A1 | 3/2012 | Switzer |
| 2012/0185481 | A1* | 7/2012 | Bjork .................. G06Q 30/02 707/E17.089 |
| 2013/0046582 | A1 | 2/2013 | Ramer |
| 2014/0279784 | A1 | 9/2014 | Casalaina et al. |
| 2016/0086222 | A1 | 3/2016 | Kurapati |
| 2016/0266755 | A1 | 9/2016 | Casalaina et al. |
| 2016/0364420 | A1 | 12/2016 | Cronin |
| 2017/0005881 | A1 | 1/2017 | Casalaina et al. |
| 2018/0240152 | A1* | 8/2018 | Mookherjee ....... G06Q 30/0256 |
| 2018/0308152 | A1 | 10/2018 | Wang |
| 2019/0102706 | A1 | 4/2019 | Frank |
| 2019/0147467 | A1 | 5/2019 | Hawkins |
| 2019/0333128 | A1 | 10/2019 | Barbour |
| 2020/0319877 | A1* | 10/2020 | Glazer ............... G06F 9/44505 |
| 2020/0372561 | A1 | 11/2020 | Sanghavi |
| 2020/0372562 | A1 | 11/2020 | Sanghavi et al. |

OTHER PUBLICATIONS

Office Action (Notice of Allowance and Fees Due (PTOL-85)) dated Feb. 25, 2022 for U.S. Appl. No. 16/421,525 (pp. 1-14).

Office Action (Notice of Allowance and Fees Due (PTOL-85)) dated Mar. 8, 2022 for U.S. Appl. No. 16/421,525 (pp. 1-3).

Sharma, Pulkit, Comprehensive Guide to build a Recommendation Engine from Scratch, Jun. 21, 2018, Analytics Vidhya, https://www.analyticsvidhya.com/blog/2018/06/comprehensive-guide-recommendation-engine-python/,p. 1-32 (Year: 2018).

Yanuarti, Rizky, Risk aversion level influence on farmer's decision to participate in crop insurance: A review; 2019, Agricultural Economics, Czech, 65, 2019 (10), p. 1-10. (Year: 2019).

Office Action dated Aug. 20, 2021 for U.S. Appl. No. 16/421,525 (pp. 1-19).

\* cited by examiner

What fields should Einstein base your prediction on?

Object: Contact – 58 of 58 fields selected

Search

🔍 Search Contact fields...

| FIELD LABEL | FIELD NAME | DATA TYPE |
|---|---|---|
| Account Name | AccountId | Lookup(Account) |
| Assistant | AssistantName | Text(40) |
| Asst. Phone | AssistantPhone | Phone |
| Attrition Reason | Attrition_Reason__c | Picklist |
| Auto Renew | Auto_Renew__c | Checkbox |
| Birthdate | Birthdate | Date |
| Car | Car__c | Checkbox |
| Contact Owner | OwnerId | Lookup(User) |
| Created By | CreatedById | Lookup(User) |
| Current Age | Current_Age__c | Formula(Number) |

Figure 6

| 702 | 704 | 706 | 708 | 710 | 712 | 714 | 716 | 718 | 720 |
|---|---|---|---|---|---|---|---|---|---|
| Target ID | Object Feature 1 | ... | Object Feature N | Offer ID | Offer Feature 1 | ... | Offer Feature M | Response ID | Response timestamp |
| 750 | | | | | | | | | |
| 752 | | | | | | | | | |
| 754 | | | | | | | | | |

DYNAMIC RANKING OF RECOMMENDATION PAIRINGS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to database systems and more specifically to integrating a predictive model for determining recommendations.

BACKGROUND

A challenge for businesses is figuring out which product, service, or actions are appropriate fits for new and existing customers. Consumers are bombarded with advertisements, offers and promotions and they are getting immune to these, especially because most of it used to be based on what the company wants to promote, rather than what the individual wants or needs. Broad brush rules, such as heuristic or intuitive rules, or customer segments, are not able to achieve the same performance as a personalized recommendation that is unique to each individual customer. Providing such irrelevant offers may frustrate customers leading to dissatisfaction or even attrition.

Thus, there is a need for an improved systems and methods for determining appropriate products and services that are relevant for particular customers to drive sales of products or services.

BRIEF DESCRIPTION OF THE DRAWINGS

The included drawings are for illustrative purposes and serve only to provide examples of possible structures and operations for the disclosed inventive systems, apparatus, methods and computer program products for providing recommendations in the context of database systems. These drawings in no way limit any changes in form and detail that may be made by one skilled in the art without departing from the spirit and scope of the disclosed implementations.

FIGS. 4-6 show examples of UIs for specifying object definitions and associated features for a prediction configuration, provided in accordance with some implementations.

FIG. 7 shows an example data structure for storing responses, arranged in accordance with one or more embodiments.

DETAILED DESCRIPTION

Figure 1:
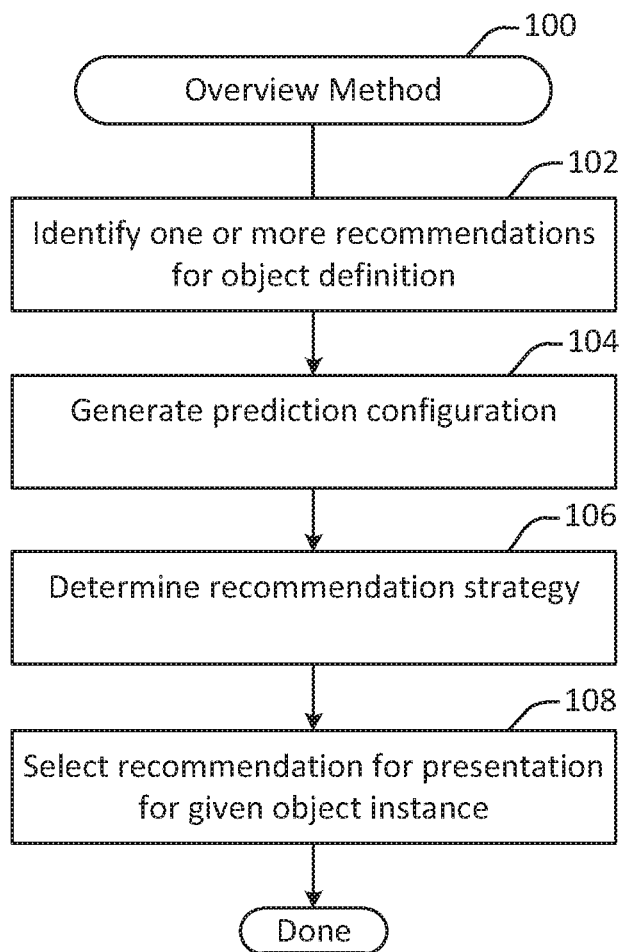
FIG. 1 illustrates an example of a method for dynamically ranking recommendation pairings for a given object instance, performed in accordance with one or more embodiments.

Some implementations of the disclosed systems, apparatus, methods and computer program products are configured for integrating a machine learning prediction platform with business rules to sort recommendations in near real-time based on propensity of the target object to accept. The predictive model is continuously updated with recommendation responses received by the system (closed-loop feedback). The described systems and methods also provide a solution to the "cold start" problem to provide recommendations for building a prediction model when data is lacking.

As described in further detail below, such prediction platform may be seamlessly integrated with any type of application or service such as a Customer Relationship Management (CRM) Platform, a social networking system, or any other consumer or business software. While CRM platforms are discussed herein as an example of an application or service, the examples of applications or services described herein may be substituted for any suitable application or service such as those described above.

Existing methods use heuristic and intuitive rules to established product fit recommendations. However, these broad-brush rules do not achieve the same performance as a personalized recommendation that is unique to each individual customer. Machine learning approaches for personalized recommendations work when substantial amounts of data are available. However, businesses with large catalogues of products increase the chances that they will offer customers irrelevant services/products because the machine learning (ML) models are poorly trained.

By way of illustration, Raymond works as Inside Sales for a Sunrise Insurance, a major insurance provider that serves high-touch B2C (business-to-consumer) and smaller B2B (business-to-business) clients. He primarily focuses on existing accounts and increasing their share of wallet across their entire product line, for instance by offering Home or Renter's insurance products to existing Auto insurance customers. However, simply offering additional insurance products to existing customers, who do not need such products or already have purchased similar products, may frustrate customers who may feel pressured by unwanted solicitations or annoyed by receiving irrelevant information.

Using conventional techniques, offers may be provided in accordance with static rules. For example, the in-house marketing team at Sunrise Insurance may define account outreach strategies each quarter based on ad-hoc analyses about which types of customers are most likely to purchase specific products. These strategies also include various state specific rules based on which products can be sold in each state. However, the application of static rules ignores customer-specific characteristics.

Using conventional techniques, Raymond can manually review customer information and attempt to intuit which products the customer may be interested in. However, such profile information may be extensive, and reviewing it may be time-intensive. Further, Raymond may not have a comprehensive grasp of what a customer with similar characteristics would be likely to purchase, which may lead to inaccurate recommendations. Additionally, Raymond may be restricted from viewing certain personal information. Thus, using conventional techniques, Raymond is likely to provide an offer that is insufficiently personalized or adapted to the particular customer, resulting in lower conversion rates and customer satisfaction.

By contrast, some embodiments of methods and systems described herein can be implemented with existing business strategies and rules to make personalized recommendations based on a target customer's characteristics and historical data. Returning to the above example, the in-house marketing team may apply a single prediction model to various products and configure the model to score the product offers based on a comprehensive set of customer data to show the likelihood of a particular customer to purchase or accept the offer. Now, as Raymond logs into his prioritized list of Accounts to call, he is able to see the most relevant product recommendations, determined by a prediction model, that are based on the customer's likelihood to purchase the product. The prediction model was able to learn these patterns based on historical information about each customer's demographic information, past product purchases, claims history, and any other life events captured by a prediction engine. Advantageously, the marketing department at Sunrise Insurance is able to enforce the business rules upstream (i.e. suppressing invalid offers based on the customer's state of residence) as part of strategy definition, which allows Raymond to truly focus on the customer interaction and provide the best pre-sales experience.

In some implementations, the disclosed systems and methods can also provide solutions to a cold-start problem, in which insufficient data is available for forming accurate predictions. A similar A/B testing solution may also be implemented to maintain a robust dataset for all potential recommendations.

With reference to FIG. 1, shown is an example of a method 100 for dynamically ranking recommendation pairings for a given object instance, in accordance with one or more embodiments. FIG. 1 is described below in context of FIG. 2 which shows a flowchart of an example recommendation strategy system 200, in accordance with one or more embodiments. At 102, one or more recommendations, such as recommendations 202, are identified for an object definition. In various embodiments, object definitions may be customized and defined by a user such as a system administrator, account administrator, or other such individual.

In certain implementations, an object definition may be a contact associated with an account. In other words, an object for the recommendation strategy may be defined as a contact. Such contacts may be customers, such as direct consumers or businesses that purchase from the account. Alternately, or additionally, objects may be defined as cases, leads, accounts, opportunities, offers, promotions, etc. The term "object instance" may be used herein to refer to a particular one of a defined object, and may be referred to herein as "target object instance" or simply "target object."

In various embodiments, recommendations may include products, promotions, discounts, free trials, paperless billing, product recommendations, automatic payment enrollments, or other offers associated with a target object in a given business context. Such contexts may include, but are not limited to: banking or investment accounts, credit accounts, insurance policies, and purchase accounts. Such recommendations may be determined by marketing or other business considerations. For example, if a particular insurance policy has been undersold over the past quarter, an insurance provider may decide to provide a promotion on such insurance policy as a possible recommendation to its customers.

Although the following figures and examples are described with references to offers, it should be understood that recommendations may additionally or alternatively correspond to other elements such as actions. Such actions may be taken by customers, sales representatives, or other individuals. As examples, actions may include requesting a phone number of a customer if contact information is missing for the customer, or escalating a particular issue based on the type of complaint.

Figure 2:
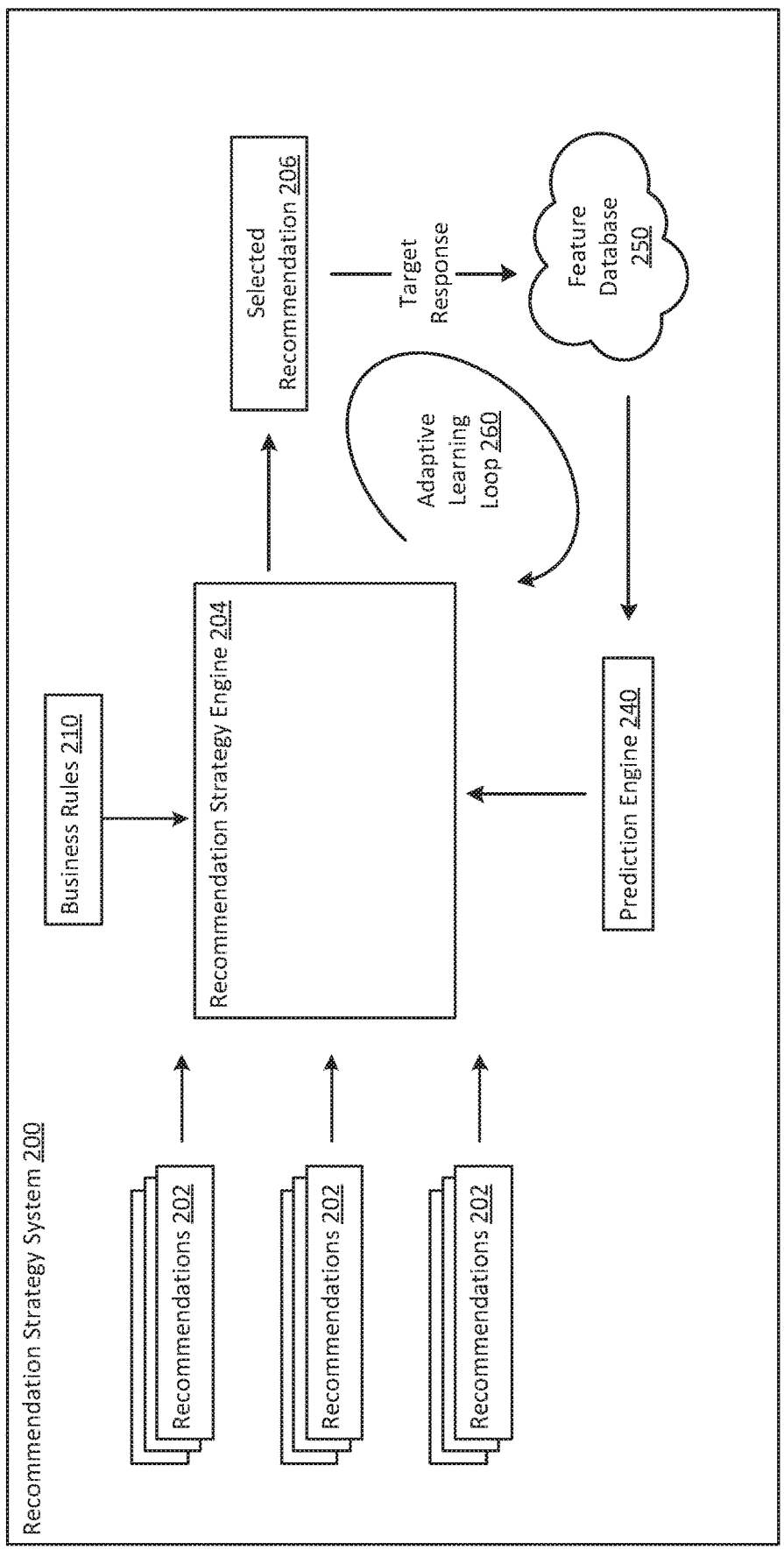
FIG. 2 shows a flowchart of an example recommendation strategy system, arranged in accordance with one or more embodiments.

At 104, prediction configuration is generated. According to various embodiments, generation of a prediction configuration may involve identifying the types of information and data to collect and build a prediction model from such information and data. A prediction engine, such as prediction engine 240, may be configured to generate a predictive model (or "prediction model") based on the prediction configuration. The configuration of a prediction engine is further described with reference to method 300 of FIG. 3. At 106, a recommendation strategy is determined. As shown in FIG. 2, a recommendation strategy may be determined for strategy engine 204, which comprises one or more business rules 210. The generation of a recommendation strategy is further described with reference to method 800 of FIG. 8.

Strategy engine 204 may further be associated with prediction engine 240 to further score and target the recommendations that satisfy business rules 210. In this way, a more relevant recommendation may be selected for presentation for a given object instance at 108, such as selected recommendation 206 shown in FIG. 2. Selected recommendations 206 may be presented to a customer associated with the target object instance.

For example, in some embodiments a customer service agent (e.g., at a call center) may make recommended offers to clients over the phone. By way of illustration, John has been a loyal customer with Ohana bank for 11 years and actively uses his credit card with the bank. Recently John noticed that his expenses were getting closer to his credit limit, so he calls Ohana Bank customer service line to request an increase to his limit. Customer service agent Maria agent takes the call, immediately creates a new case to capture John's request. As Maria verifies John's Social Security number and submits the request for credit increase, several recommendations for upsell offers are triggered based on the prediction model, including a new IRA account for him and a newly created Life insurance instrument to save some of his money for future home purchase. In a similar manner, an inside sales representative may make recommended offers to account prospects (e.g., leads) or upsell products or services to existing customers. As another example, a financial advisor or personal banker (typically at a retail location) may make recommended offers to their clients in person.

In yet another example, recommended self-service offers may be presented to the end consumer interacting on a website or mobile application. By way of illustration, Rachel logs into her bank's website to pay a couple of bills and checks on her recent spend for the month. She uses the website to pay utilities and other bills and also pay off her credit card in full amount before the due date. Offers to her can be made at different times during her session such as: when she logs off from the site, next to her "Accounts Overview" screen as she is reviews her balance etc., embedded on her monthly statement that is emailed—likely in the email body itself, as an offers alert or pop-up message on the website, or on the main website before she logs in once her browser has been associated with a cookie.

Target responses to the recommendations may be stored in feature database 250. Such responses may be received by various mechanisms. For example, a representative, such as a customer service agent, inside sales representative, financial advisor, or personal banker, may record responses after making the recommended offers to customers. For instance, if John confirms his interest in opening the IRA account, Maria the agent can click Accept on the recommendation, which may launch a flow which guides Maria through the step-by-step process of opening an IRA account.

In some embodiments, a website or mobile application may track end consumer responses based on user activity of the end consumer on such website or mobile application. The responses may include various features related to the respective object instance and/or respective recommended offer. In some embodiments, target responses may correspond to whether an associated offer is accepted. However, other possible responses include various downstream conversion metrics that may be attributed to a presented recommendation, such as product purchase data or particular action taken by a customer or customer representative.

In some embodiments feature database 250 is a table level distributed database system configured to store and associate the features with the respective object instances and recommended offers. The storage of response data is further described with respect to FIG. 7 below.

The data stored in feature database 250 may be used as training data to dynamically update prediction engine 240 resulting in an adaptive learning loop 260. Data gathering for the prediction model is further described with reference to FIG. 13. As more training data is received, the prediction engine 240 is updated to make more accurate recommendations in strategy engine 204 to recommend more targeted offers. However, in order to maintain a robust dataset for all potential offers and to prevent certain offers from being overrepresented, the described systems and methods provide an A/B testing solution which is further described with respect to FIG. 14. A similar technique is implemented to obtain sufficient data with a diversity of responses for creating the predictive model while seamlessly providing recommendations based on the recommendation strategy. This cold-start solution is further described with reference to FIG. 15.

Figure 3:
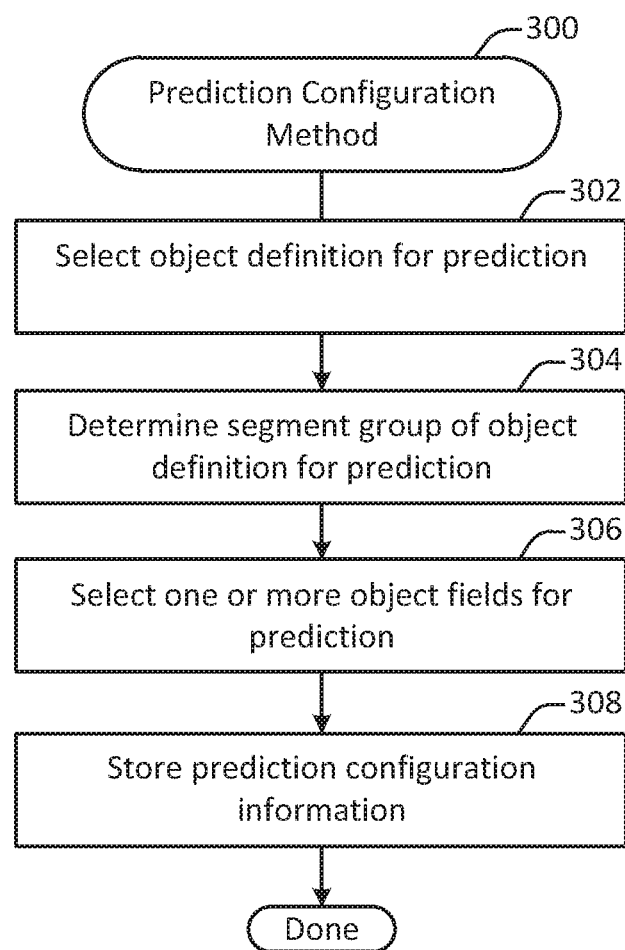
FIG. 3 shows a prediction configuration method, performed in accordance with one or more embodiments.

With reference to FIG. 3, shown is a prediction configuration method 300, in accordance with one or more embodiments. FIG. 3 is described below in context of FIGS. 4-6, which show example user interfaces (UIs) for specifying object definitions and associated features for a prediction configuration, in accordance with one or more embodiments.

Figure 4:
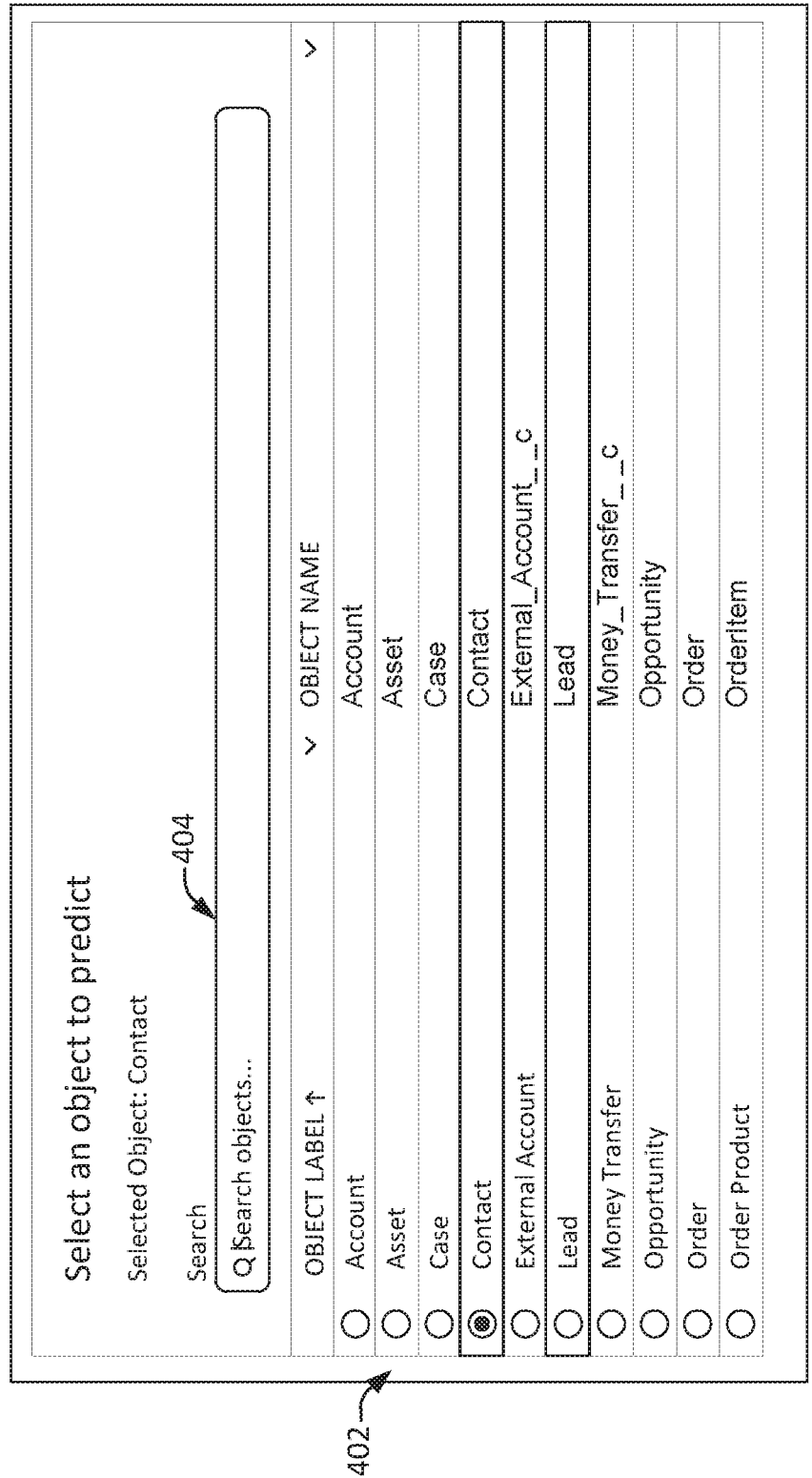

At 302, an object definition for prediction is selected. In various embodiments, the object definition designates the type of object with respect to which the prediction engine will score recommendations. As described, an object definition may be customized and defined by the user. An object definition may be defined as contacts such as customers, as well as cases, leads, accounts opportunities, etc. For example, a user may access a prediction configuration on a user interface of a CRM platform, such as a user interface 400. User interface 400 may be displayed on a computing device of a user of an application or service. As shown in FIG. 4, in some embodiments, user interface 400 displays a list 402 of possible object definitions. Such object definitions may be designated by an object label and/or object name. User interface 400 may also display a search bar 404 for receiving input to search for particular object labels or object names.

As shown in FIG. 4, the "contact" object label has been selected. However, other object definitions may include, without limitation, accounts, assets, cases, external accounts, leads, money transfers, opportunities, orders, order products, etc. The selected object definition identifies an object type for the recommendation model to base scoring predictions on. For example, the prediction model may score different offers based on features and other data associated with a particular object.

In some embodiment, a likelihood or probability of acceptance of an offer by a particular contact may be modeled as a propensity score. For example, with contacts selected as the object definition, the prediction model will generate scores for different offers corresponding to the likelihood of acceptance of such offers by particular contacts.

In some embodiments, multiple object definitions may be joined with other related objects to enrich the machine learning features. For example, opportunities, accounts, and contacts may be selected to make predictions for the acceptance of an offer provided in the context of an account. For instance, offer information may be combined with account information, contact information, and other such data to improve the quality of the prediction.

At 304, a segment group of the object definition is determined for predictions. According to various embodiments, a segment group identifies a subset of the selected object definition and allows the prediction to be focused on particular groups, such as particular groups of clients, a sales region, or a division in the user's company. The object definitions may be focused based on features or other characteristics associated with the object definitions. For example, Sunrise Insurance may provide insurance policies for a number of different contacts, including homeowners, renters, automobile owners, as well as company employees and students. Sunrise Insurance may want to exclude contacts who are homeowners from predictions for recommendations of particular offers.

Figure 5:
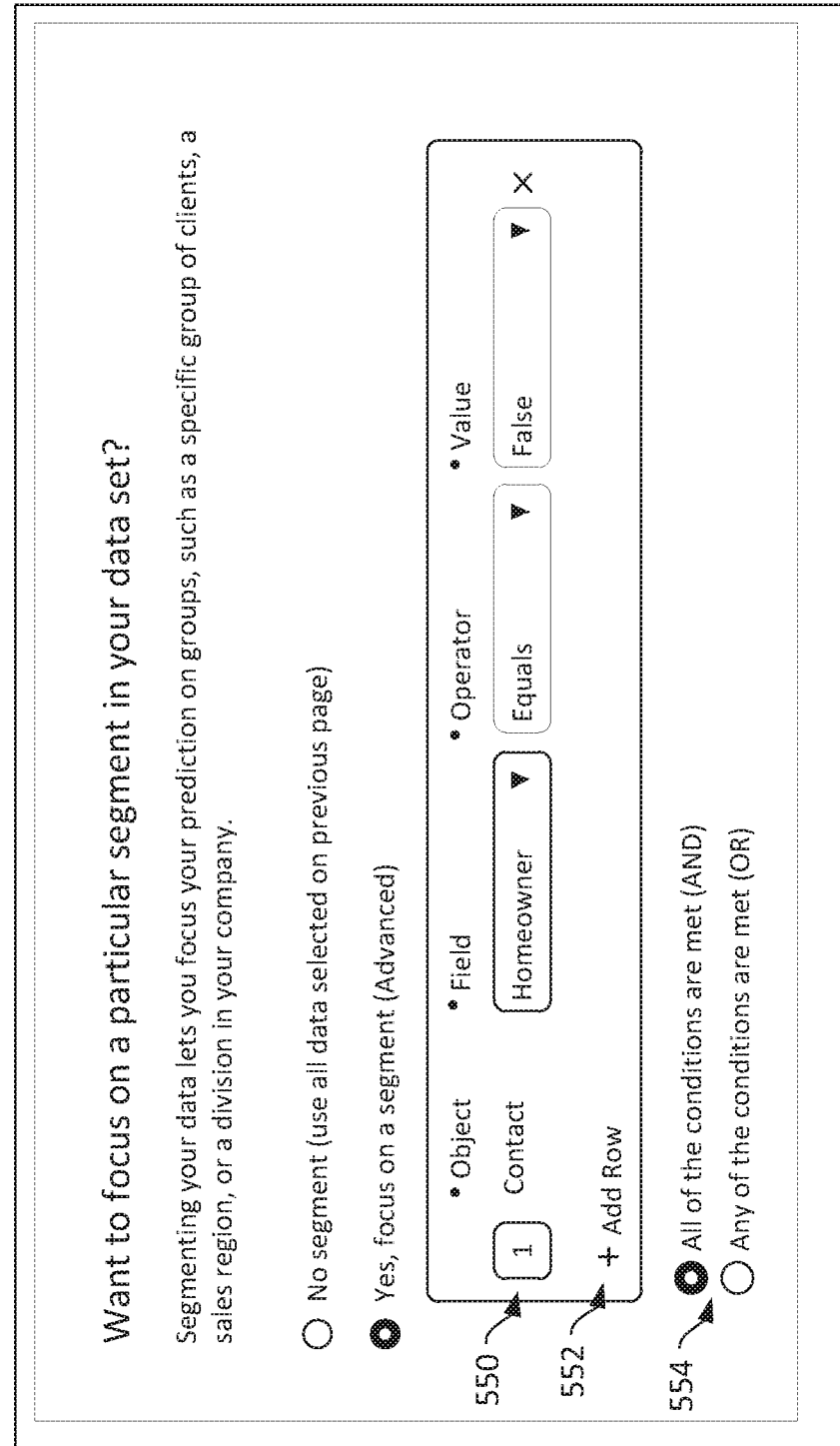

FIG. 5 shows user interface 500 for determining segment groups of object definitions. In row 550, the "contact" object definition is identified, and "homeowner" is selected as a feature of the segment group in the object field column. An operator of "equals" and a value of "false" is further selected in row 550. As such, the segment group of the object definition of contacts includes only contacts who are not homeowners. Additional rows may be added at 552 to further focus the selected object definitions. Various other features or characteristics associated with the object definition may be selected for the object field column, such as those shown in FIG. 6. The conditions identified in rows 550 and/or other rows may be set with various other operators, such as greater than or less than, and other values, such as true or a numerical value. In certain embodiments, multiple rows of segment groups may be applied using Boolean logic at selection 554.

At 306, one or more object fields are selected for prediction. According to various embodiments, the prediction model may be further customized by selecting particular object fields of the object definition. For example, each object instance of a contact may include various object fields that indicate different characteristics of the contact, such as gender, age, or other such properties.

FIG. 6 shows user interface 600 for selecting object fields, in accordance with one or more embodiments. In some implementations, user interface 600 displays a list 602 of possible object fields. Such object fields may be designated by field label, field name, and/or data type. These object fields may include, without limitation, account name, assistant, assistant phone, attrition reason, auto renew, birthdate, car, contact owner, created by, current age, etc. User interface 600 may also display a search bar 604 for receiving input to search for particular object fields.

As shown in FIG. 6, all object fields are selected, allowing the prediction engine to generate a predictive model based on all fields for contacts to score recommendations. On the other hand, if the "birthdate" object field was deselected, for example, the prediction engine would not consider the birthdate or age of contacts in generating a predictive model.

At 308, the prediction configuration information is stored. In some embodiments, the prediction configuration information from steps 302-306 may be stored in a database, such as in feature database 250 or other database associated with prediction engine 240. The feature database 250, or another database associated with predicted engine 240, may be configured to store response data corresponding to selected recommendations.

FIG. 7 shows an example data structure 700 for storing responses, in accordance with one or more embodiments. As responses are recorded, either by a representative or automatically via website or applications, the target object and the selected recommended offer may be associated and stored. In other words, data associated with the target object and data associated with the offer recommendation are stored along with the response (acceptance or rejection) of the recommendation. As shown in FIG. 7, data structure 700 may be represented as a table with columns 702-720 and rows 750-754. Although a given number of rows and columns are depicted in FIG. 7, data structure 700 may comprise any number of rows and columns to suit the data collected and stored.

In data structure 700, each row of the data set represents a response to a recommendation associated with a target object. According to various embodiments, the data set may be used as training data to generate or update a prediction model by the prediction engine. Column 702 stores the target identification (ID) identifying the target object associated with the recommendation. In various embodiments, the Target ID may be an identification code or other description corresponding to the target object. Columns 704, 706, and 708 store object features associated with the target object. Such object features in columns 704-708 may correspond to values of the object fields selected at 308 using interface 600. In some embodiments, the object features may either be raw or derived from the selected object fields, aggregations from child object instances or object fields from parent object instances computed through joins and other transformations. Although columns 704-708 are depicted, data structure 700 may include any number of columns to accommodate each object field selected at 308.

Column 710 stores the Offer ID which identifies the recommendation presented to the customer. In various embodiments, the Offer ID may be an identification code or other description corresponding to the offer associated with the target object. Columns 712, 714, and 716 store offer features associated with the recommended offer associated with the target object. Such offer features may be the values of the characteristics or fields of the particular offer object instance and its parent or child object instances. Such offer features may indicate characteristics such as the size of a discount, the duration of the promotion, product type, the mode of the offer (i.e., in-person, video, image, interactive, etc.), and other object fields for an offer. Although columns 704-708 are depicted, data structure 700 may include any number of columns to accommodate each object field selected at 308.

Columns 718 and 720 store the response ID and response timestamp, respectively. In some implementations, such information may indicate the target object's historical response to the particular recommended offer. Various signals may be tracked as a response ID. The response ID in column 718 may indicate the nature of the response, such as whether a contact accepted or rejected the presented offer. In some embodiments, the prediction model may be configured to record various downstream conversion metrics which may be attributed back to an offer or action associated with the recommendation. For example, product purchase data may be indicated in the response ID as whether a product associated with the recommendation was purchased and a date of the purchase. As another example, the response ID may indicate whether a customer action, associated with the recommendation, was taken at a later date. Other responses metrics may be extrapolated from customer feedback or ratings, such as via a performance survey.

Additionally, interactions with the offer may also be recorded, such as whether a contact listened to the entire offer from a sales representative, or whether a contact viewed an entire video of the offer. The response timestamp in column 720 may indicate the date and/or time the response was received or made by the target object.

Although data structure 700 is described with reference to contact objects and offer objects, various features of various other objects may be tracked and stored using data structure 700 based on the object definitions identified.

According to various embodiments, by harmonizing the data into a single data structure, such as data structure 700, a single model may be used across all offers to reduce the data requirements for recommending newer offers that have not accumulated sufficient response data, such as by implicitly leveraging response data from "similar" offers determined using attributes (offer features) on the offer object. Standard object features or custom object features for offer objects may be implemented to identify patterns across various offers. A single model also supports finding common patterns across the entire set of offers and surfacing them in model metrics to provide better insights. This approach also implicitly handles scenarios where some offers have sufficient responses but others do not.

Figure 8:
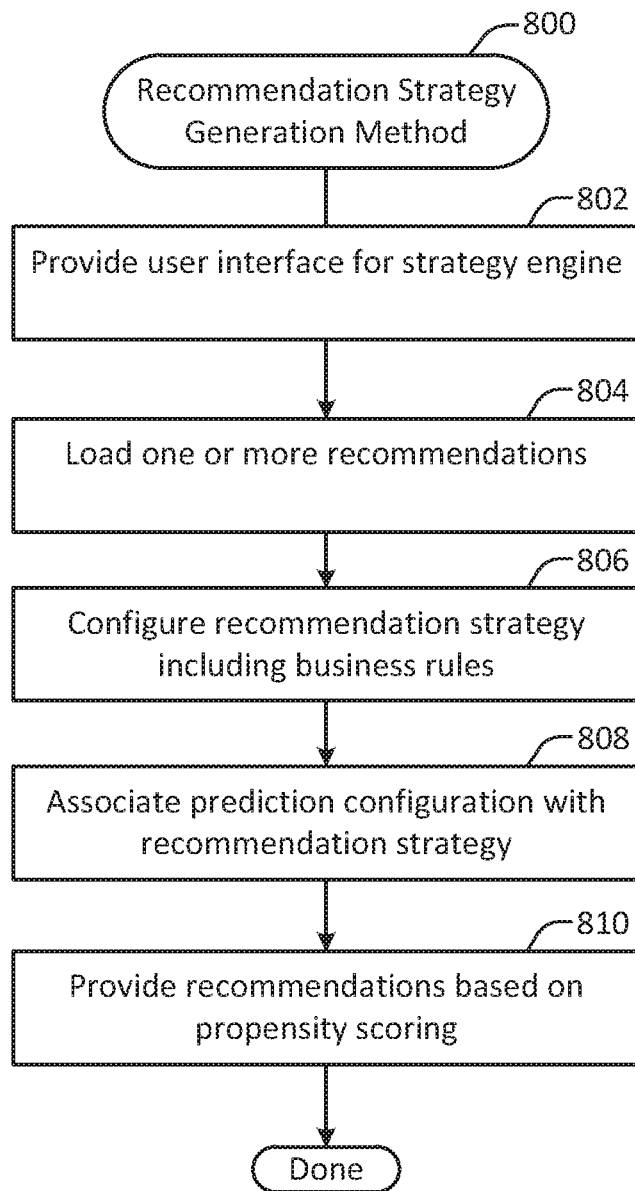
FIG. 8 shows an example method for generating a recommendation strategy, performed in accordance with one or more embodiments.

With reference to FIG. 8, shown is an example method 800 for generating a recommendation strategy, in accordance with one or more embodiments. FIG. 8 is described below in context of FIGS. 9-12, which show example user interfaces (UIs) for associating various filter rules and other business rules with selected recommendations, in accordance with one or more embodiments. In various embodiments, method 800 may be implemented by a user, such as an account manager of an in-house marketing team. Method 800 will be discussed with reference to the example of Sunrise Insurance, previously discussed, At 802, a user interface is provided for configuring a recommendation strategy engine. FIGS. 9-12 show an example user interface 900 for configuring a recommendation strategy 990, in accordance with one or more embodiments. As depicted, user interface 900 displays recommendations, filters, and business rules for insurance products for an insurance company, such as Sunrise Insurance previously discussed.

In various embodiments, user interface 900 comprises a canvas 910, ribbon 920, and toolbar 930. Ribbon 920 may include various commands and configuration options, including model configuration 922 which may be used to set the recommendation strategy for a particular geographic area. As shown, the recommendation strategy is configured for contacts in the United States. Toolbar 930 includes various operations for configuring the recommendation strategy, such as load recommendation. Other operations may include recommendation logic such as filters, reoffer limits, and sorts. Other operations may include branch logic such as branch merge, branch selector, etc. Yet further operations may include prediction configuration association. The various operations may be implemented within canvas 910 to configure the recommendation strategy.

Figure 9:
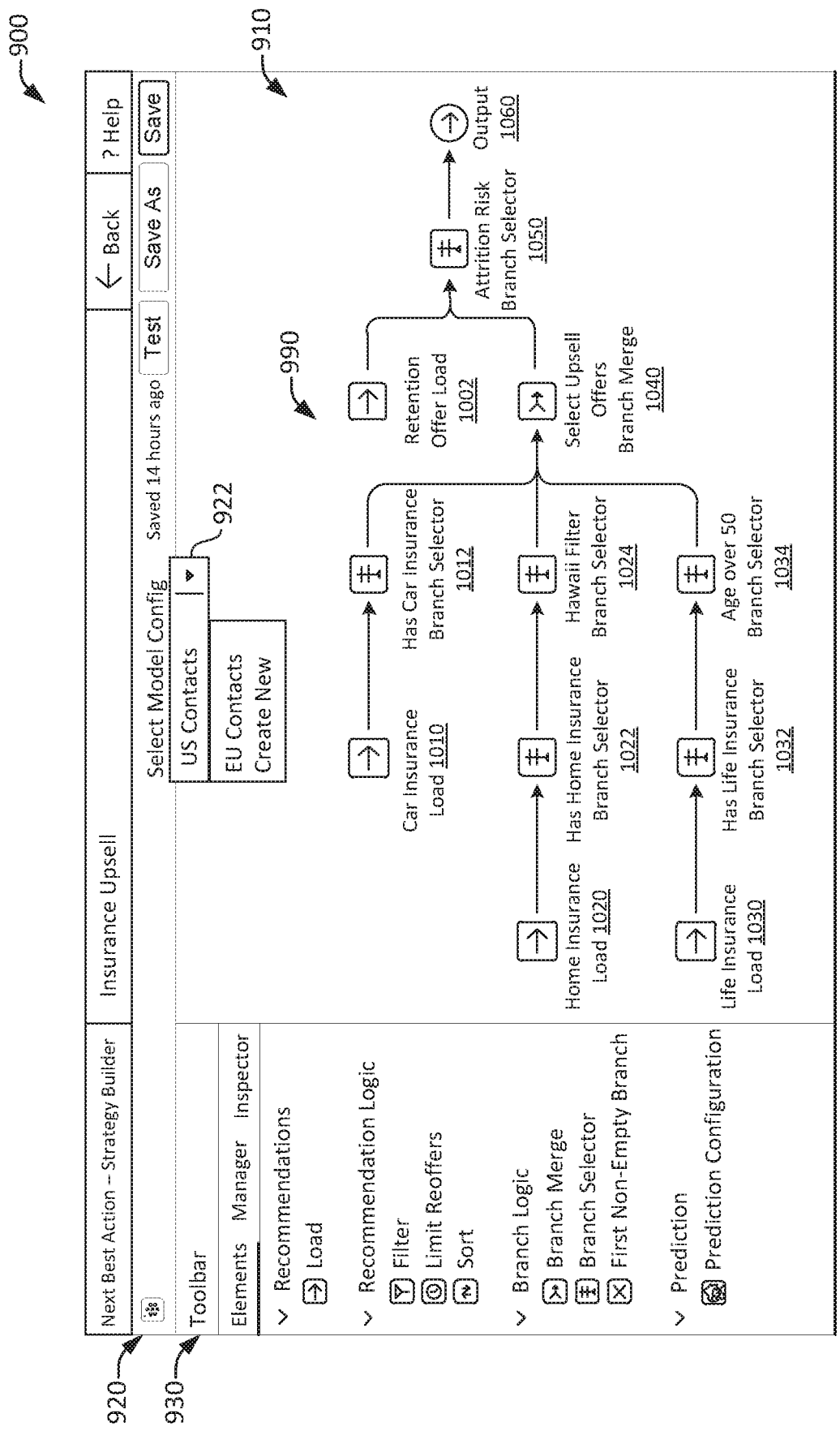
FIGS. 9-12 show examples of UIs for generating a recommendation strategy, provided in accordance with one or more embodiments.

At 804, one or more recommendations are loaded. As shown in FIG. 9, the recommendation strategy has been configured with three recommendation loads, each load operation indicating a recommendation which has been loaded into the recommendation strategy. In the illustrated example, three product upsell offers have been loaded into canvas 910 by Sunrise Insurance, including an upgrade to car insurance corresponding to car insurance load 1010, additional home coverage corresponding to home insurance load 1020, and additional life insurance products corresponding to life insurance load 1030. In some embodiments, recommendations are loaded onto canvas 910 by selecting the load operation from toolbar 930. In some embodiments, recommendations are loaded onto canvas 910 by dragging the load operation from the toolbar to a location on canvas 910. Loading the recommendation may prompt a recommendation configuration window to display in which the user may select particular offer objects or define custom offer objects. Such offers may include various associated object fields or features as described above. Each loaded offer creates a decision branch in the recommendation strategy.

At 806, a recommendation strategy is configured for the loaded recommendations. According to various embodiments, this may include associating the loaded recommendations with various business rules and filters using recommendation logic and branch logic operations. For example, as shown in FIG. 9, each loaded recommendation is associated with at least one branch selector operation. A branch selector may be configured to create an expression for the corresponding branch that flows through the element. If the expression is true, the recommendations in the branch are allowed through. If false, the recommendations in the branch do not progress any further through the strategy. A "has car insurance" branch selector 1012 is applied to car insurance load 1010. As such, the car insurance upsell recommendation 1010 would only be a possible recommendation for a target object that is shown to already own car insurance.

Similarly, a "has home insurance" branch selector 1022 is applied to home insurance load 1020, and a "has life insurance" branch selector 1032 is applied to life insurance load 1030. Additionally, a "Hawaii filter" branch selector 1024 has been applied to home insurance load 1020, allowing the home insurance upsell offer through if the target object is determined to reside in Hawaii. For example, home insurance load 1020 may correspond to an offer for tsunami and volcanic eruption coverage for homes located in island locations. Additionally, an "over 50" branch selector 1034 is applied to life insurance load 1030, allowing the life insurance upsell offer through if the target object is determined to be over 50 years in age. For example, life insurance load 1030 may correspond to an offer for long-term care insurance for daily living assistance, which is more appropriate for individuals over the age of 50.

According to various embodiments, the loaded recommendations may be sorted into a single branch by "select upsell offers" branch merge operation 1040. In certain embodiments, branch merge operation 1040 determines the maximum number of recommendations allowed through the single branch where the sort element (branch merge operation) is placed. As such, a branch merge operation, such as operation 1040, may be configured to select one or more recommendations based on predetermined requirements. For example, a number of the highest ranked recommendations may be allowed to pass through the branch merge operation. However, other predetermined requirements may be configured for the branch merge operation, such as the lowest ranked recommendations, or random selection, for example.

In the present example, branch merge 1040 may be configured to allow only a single highest ranked recommendation through to be provided based on the target object. The recommendations that pass through their respective branch selector operations may be ranked by a static ranking rule corresponding to business rules associated with business. For example, the car insurance upgrade may be ranked first, the additional home coverage second, and the additional life insurance product third. Thus, if the home insurance recommendation branch and the car insurance recommendation branch are both selected based on their respective branch selector operation elements, the car insurance recommendation will be suggested for presentation over the home insurance recommendation by branch merge operation 1040.

In some embodiments, the static ranking rule assigns a ranking score to each recommendation which may be determined by the business. In some embodiments, the ranking score may correspond to an estimated propensity of a given contact to accept the recommendation. In some embodiments, the ranking score may be determined based on historic data, statistics collected by the businesses, or any one of various other business considerations. For example, Sunrise Insurance may have experienced a decline in customers for the car insurance sales, and as a result, has decided to offer the upgrade to car insurance to existing customers whenever applicable and ranking it higher than the other recommendations. As another example, Sunrise Insurance may have historically been more successful in selling additional home coverage compared to additional life insurance products, and as such, rank the home insurance offer higher than the life insurance offer.

In some implementations, as with the load operations, these operations may be applied to respective recommendations by selecting the operation from toolbar 930. Selecting the operation may involve dragging the operation from the toolbar to the corresponding branch of the recommendation load on the canvas. Loading the operation may prompt a configuration window to display in which the user may configure the operation. The highest ranked recommendation then passes to output operation 1060, which may present the recommendation to a customer service representative or to the contact directly, as described.

In some embodiments, retention offer load 1002 may also be loaded into recommendation strategy 990. Retention offer load 1002 may correspond to a recommended retention offer for a target object instance, such as a customer, who is at risk of attrition or cancellation of a product. For example, the recommended retention offer may be a discount on an existing insurance policy of the target object customer. An "attrition risk" branch selector 1050 may be configured to determine the risk of attrition of a particular target object and determine whether to allow the retention offer or the recommendation from branch merge operation 1040. Alternatively, branch selector 1050 may be implemented as a branch merge operation. For example, attrition risk branch selector 1050 may allow the retention offer to pass if the attrition risk of a particular contact is greater than 25%, otherwise it allows the highest ranked recommendation from branch merge operation 1040. Retention offer load 1002 and attrition risk branch selector 1050 are optional operations.

According to various embodiments, the risk of attrition may be determined by various methods, including by a generated predictive model as discussed herein. Such a predictive model is focused on evaluating a single recommendation (the retention offer). However, the systems and methods for predictions described herein can be implemented to generate predictive models that are further applied to prioritize multiple eligible offers in the recommendation strategy.

At 808, a prediction configuration is associated with the recommendation strategy. In some embodiments, a prediction configuration, such as that determined by method 300, is associated with recommendation strategy 990. This may be performed by selecting prediction configuration operation 1070 from toolbar 920 or dragging prediction configuration operation 1070 from toolbar 920 into canvas 910. The selection of the prediction configuration operation may prompt a prediction configuration window to display on user interface 900 in which the user may generate a prediction configuration, such as via method 300, or select an existing prediction configuration.

Figure 10:
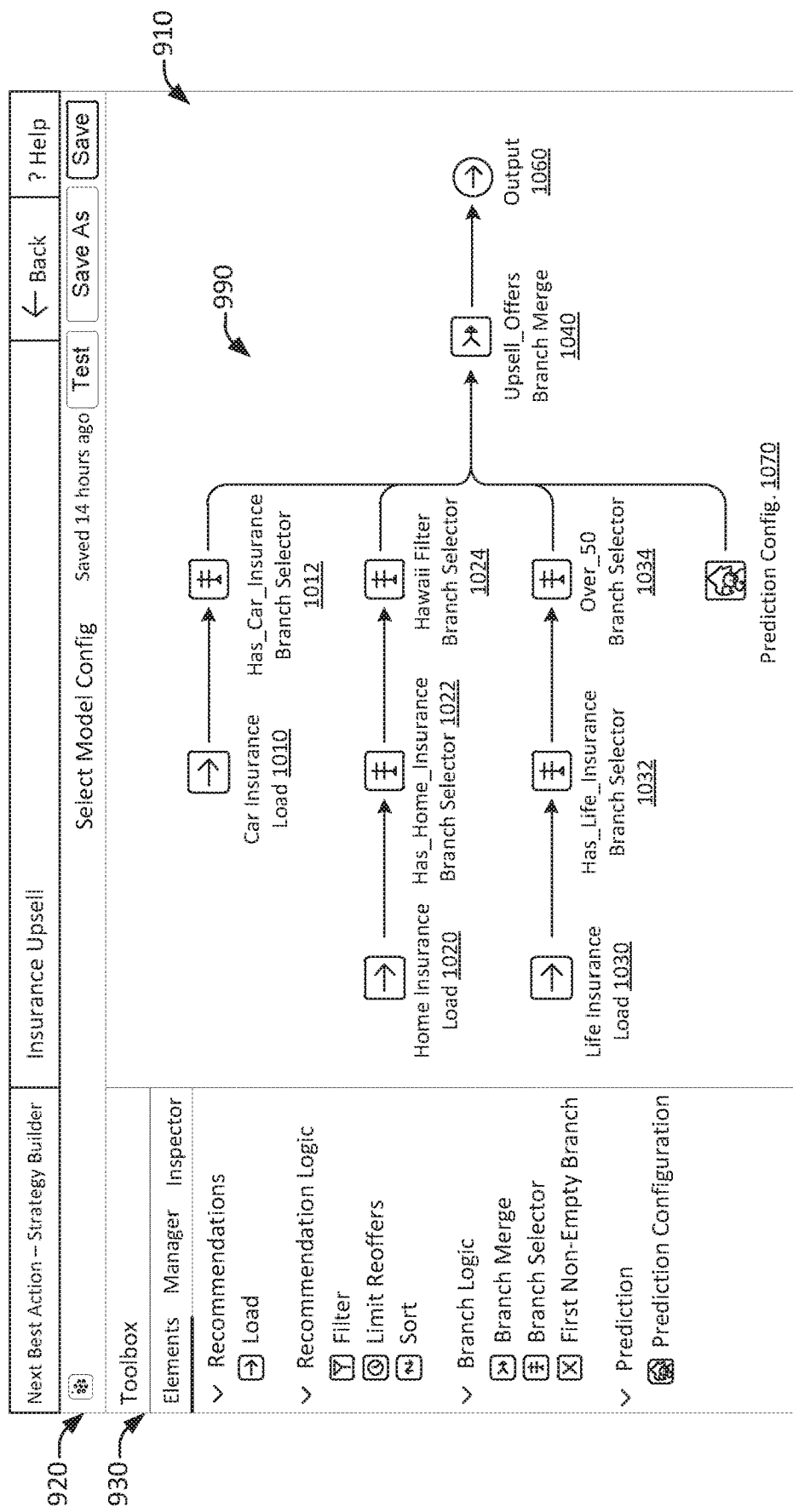

As shown in FIG. 10, prediction configuration operation 1070 is loaded onto canvas 990. However, in FIG. 10, the prediction configuration is not currently applied to any of the recommendations. In certain embodiments, initial selection of the prediction configuration operation may arbitrarily place the prediction configuration within the recommendation strategy in canvas 910. The user may then select one or more of the branches to associate the prediction configuration operation 1070 with on user interface 900.

Figure 11:
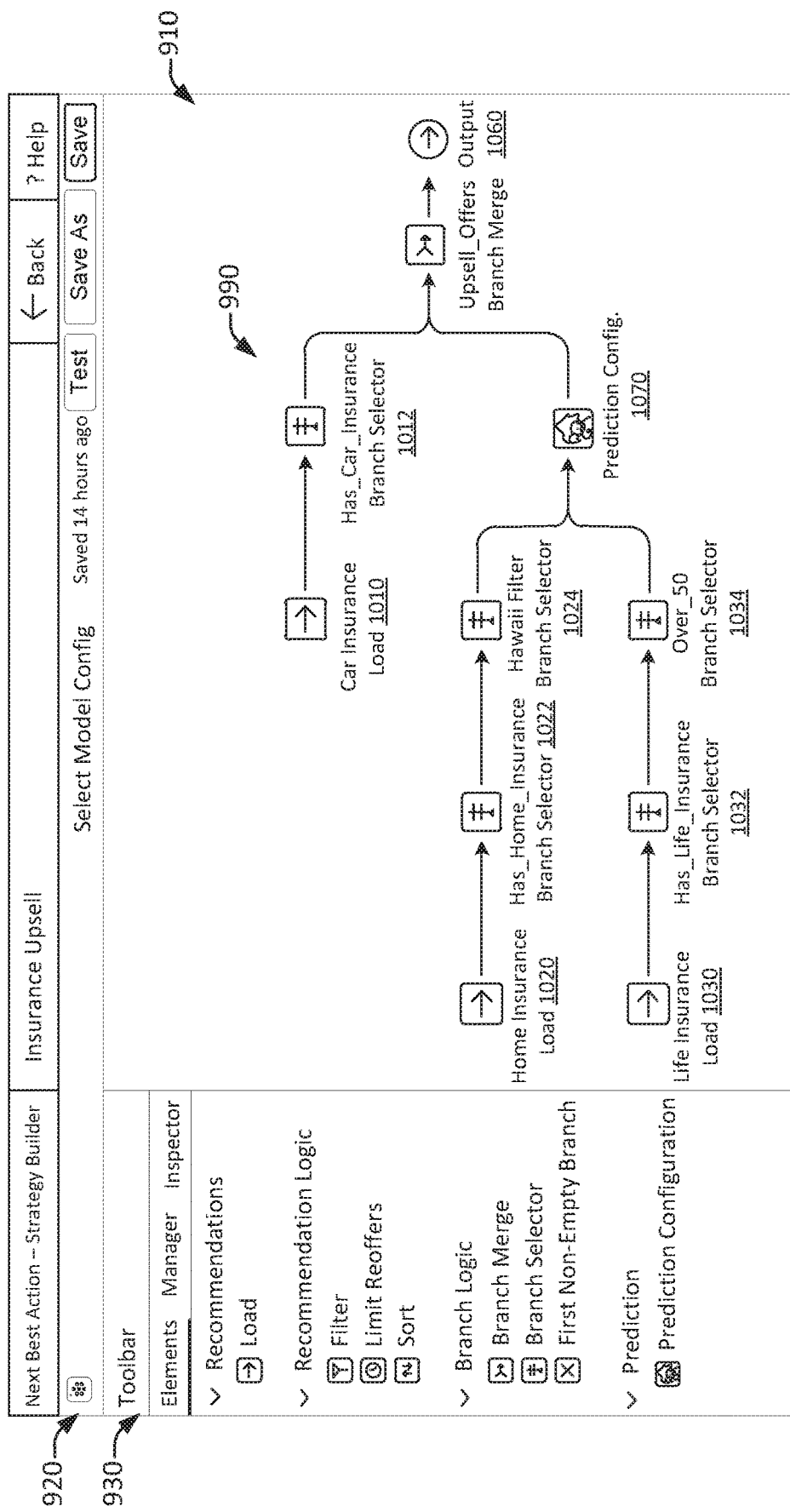

As shown in FIG. 11, prediction configuration operation 1070 has been associated with the branches corresponding to home insurance load 1020 and the life insurance load 1030. As such, the car insurance load 1010 remains rules based and does not run through the prediction configuration. However, the home insurance and life insurance offers are now scored and ranked via the prediction configuration based on the object features and object segment groups defined via method 300. As such, a single prediction model may be implemented for multiple recommendations, rather than requiring a separate prediction model to be configured and generated for each recommendation which would require gathering sufficient response data for each recommendation. In contrast, a single prediction model may be able to compare the likelihood of acceptance of the multiple offers even if there is insufficient for a complete standalone prediction model for one or more of the offers.

Figure 12:
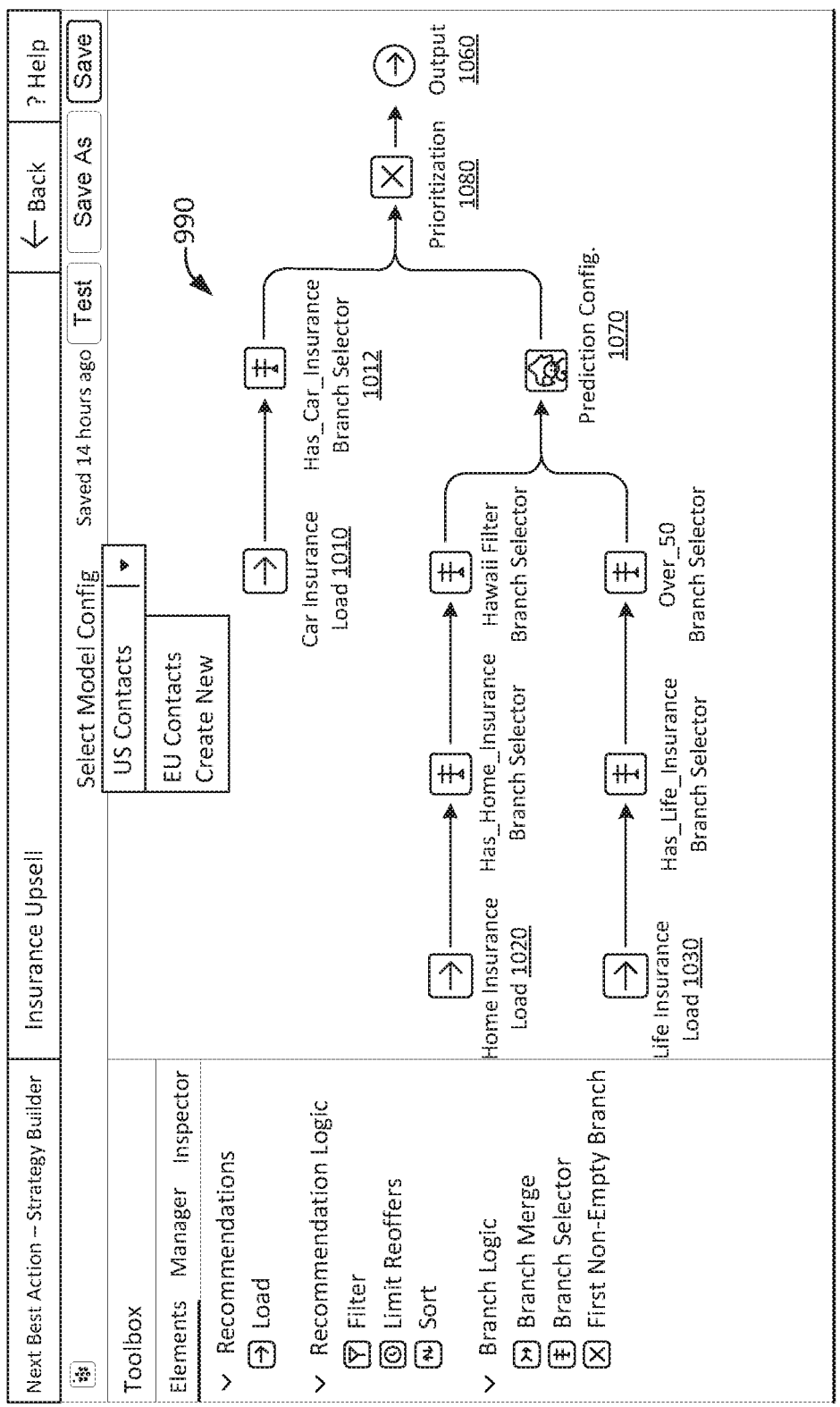

The prediction configuration may further be implemented with other business rules. As shown in FIG. 12, the upsell offers branch merge operation 1040 has been replaced with a prioritization operation 1080. In various embodiments, prioritization operations are configured to filter branches based on the first non-empty branch in the order that they appear on the canvas, such as from top to bottom. Such element may evaluate each branch in the specified order until it finds one that contains valid recommendations. When the element recognizes that a branch contains valid recommendations, it allows those recommendations through and blocks recommendations from all other branches.

At 810, recommendations are provided based on propensity scores generated by the prediction model. In some implementations, the associated prediction configuration may score the recommendations based on the propensity of a given target object (i.e., given contact) to accept such recommendation and pass through the recommendation with the highest propensity score. The propensity score will be based on the particular object features of the contact as well as the offer making it more personalized and targeted than the static ranking rule. The recommendations scored by the prediction configuration must still satisfy the associated business rules, such as branch selectors and other filters. The recommendations may be scored in near real-time for a given contact to provide focused recommendations during the interaction between the contact and a representative, website, or application.

In some embodiments, the propensity score may correspond to other business considerations. The prediction model may be additionally and/or alternatively configured to score the recommendations based on a combination of other business considerations such as optimizing revenue or profit. For example, the determined score for a recommendation may correspond to how well a corresponding offer would optimize profit based on a likelihood of acceptance of such offer, the amount of potential revenue brought in by the offer, and/or business expenses associated with the offer. In some embodiments, the prediction model is configured to score recommendations based on optimizing product variety for a particular target object. For example, a particular recommendation may receive a higher score if data shows that the particular target object has not been previously provided or associated with a corresponding offer.

In the example embodiment shown in FIG. 11, the recommendation with the highest scoring propensity score is then compared with the ranking score of the car insurance recommendation, if applicable. In the example embodiments shown in FIG. 12, the first branch with a passing recommendation is output by operation 1060. Thus, if the car insurance recommendation passes branch selector 1012, then it would be selected to be output even if the home insurance recommendation passed and included a propensity score higher than the ranking score for the car insurance recommendation. As explained, in some embodiments, multiple recommendations may be output by operation 1060 depending on the recommendation strategy for a user to select.

According to various embodiments, the selected recommendations may then be implemented. For example, recommended offers may be presented to a contact, or recommended actions may be taken by representatives. In the example of Sunrise Insurance, the sales representative, Raymond, may be presented with the home insurance offer as the most relevant offer for a given customer contact and provide the offer to the customer.

In some implementations, the recommendation strategy may be generated using an integrated user experience, allowing users to easily configure the recommendation strategy and prediction configuration with straightforward user actions, such as selecting or dragging operations on a user interface. The prediction configuration can also be integrated into an existing recommendation strategy platform. With a single configuration session, a prediction engine can be configured to automatically build a prediction model and constantly monitor data moving forward to update the model. As such, users may easily configure prediction models, without extensive knowledge or training in machine learning or computer programming.

As previously described, in various embodiments, responses to the recommendations are identified and associated data is stored to dynamically update the prediction model generated by the prediction configuration. However, in some embodiments, there must be sufficient data in order for a prediction model to be generated. This issue may arise where businesses have little or no historic data regarding offers and other recommendations, such as where a new offer is being launched.

Figure 13:
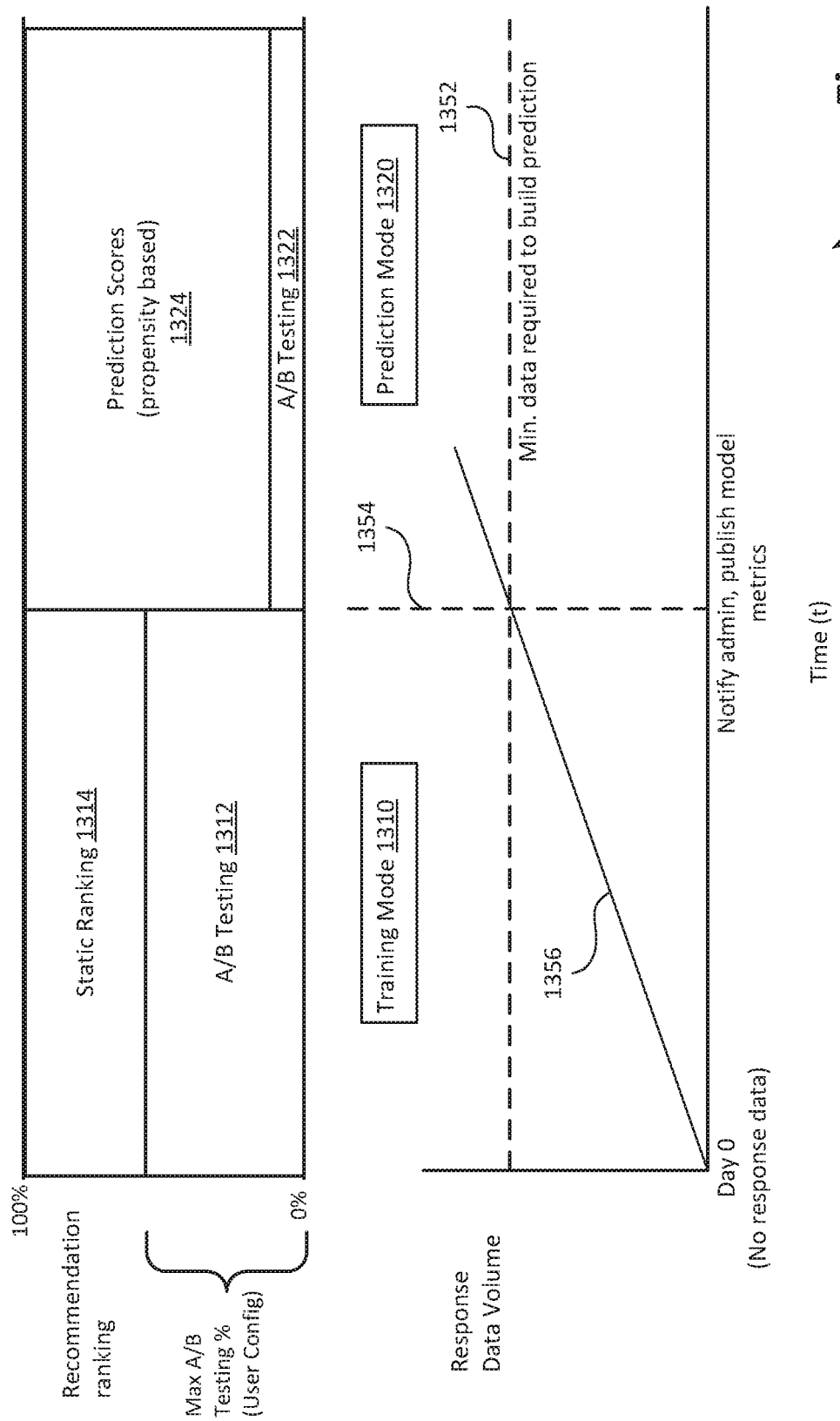
FIG. 13 shows a diagram and corresponding chart illustrating a predictive model training procedure, arranged in accordance with one or more embodiments.

In some embodiments, a randomized recommendation procedure is implemented to gather enough data to generate an accurate prediction model, while seamlessly providing recommendations using static ranking rules and other business rules. Such randomized recommendation procedure may implement A/B testing techniques. With reference to FIG. 13, shown is a diagram 1300 illustrating a predictive model training procedure, in accordance with one or more embodiments. The diagram 1300 plots response data volume on the Y-axis against time (t) on the X-axis. Line 1356 represents the cumulative amount of response data received or identified by the recommendation strategy system, which is stored in a feature database. As shown by line 1356, the response data volume increases as responses to recommendations are received over time. Although the response data volume shown by line 1356 is represented as a linear function of time, the response data volume may increase at varying rates. Generally, the response data volume should increase with time. However, in some embodiments, the recommendation strategy system may purge or isolate data of a certain age or data that is determined to be irrelevant such that response data volume may decrease over a period of time in certain circumstances.

Dashed line 1352 represents the threshold amount of data required by the prediction configuration to generate a prediction model. As used herein, dashed line 1352 may also be referred to as data threshold 1352. According to various embodiments, until data threshold 1354 has been reached, the recommendation strategy system may operate in training mode 1310 in which the prediction engine is not implemented in scoring recommendations. Data threshold 1352 may be determined by the user or by a threshold prediction accuracy. For example, a user determining the prediction configuration may set the data threshold 1352 to five thousand responses. As another example, the user may set a threshold prediction accuracy to 75%. Accordingly, the prediction configuration will continue to gather response data until the prediction model can correctly predict which recommendations will be accepted by a particular target object 75% of the time based on training data. In some embodiments, the prediction model is generated and updated with additional data during training mode 1310 until it is deemed to be sufficiently trained. Thus, threshold 1352 may not be a fixed amount because additional or less data may be required. Data threshold 1352 may also be determined by any other suitable machine learning techniques.

In some embodiments, a minimum amount of data is also required to generate a prediction model during training mode 1310. This minimum amount of data may also be predetermined and/or set by the user. For example, the prediction configuration may specify a minimum of five hundred responses for each recommendation associated with the prediction configuration before a prediction model is generated.

Once the amount response data 1356 reaches data threshold 1352, the prediction model may be made available to score recommendations in the associated recommendation strategy. This time point is depicted in FIG. 13 by line 1354, which will be referred to herein as publish time 1354. At publish time 1354, the recommendation strategy system may begin operating in prediction mode 1320. The user may also be notified and provided with published metrics of the prediction model.

In various embodiments, the prediction model may be generated using various machine learning techniques and algorithms. In some embodiments, the prediction model is associated with one or more computational layers of a neural network. In some embodiments, the prediction model may generate weighted coefficients applied to various object features to score particular recommendations.

Figure 14:
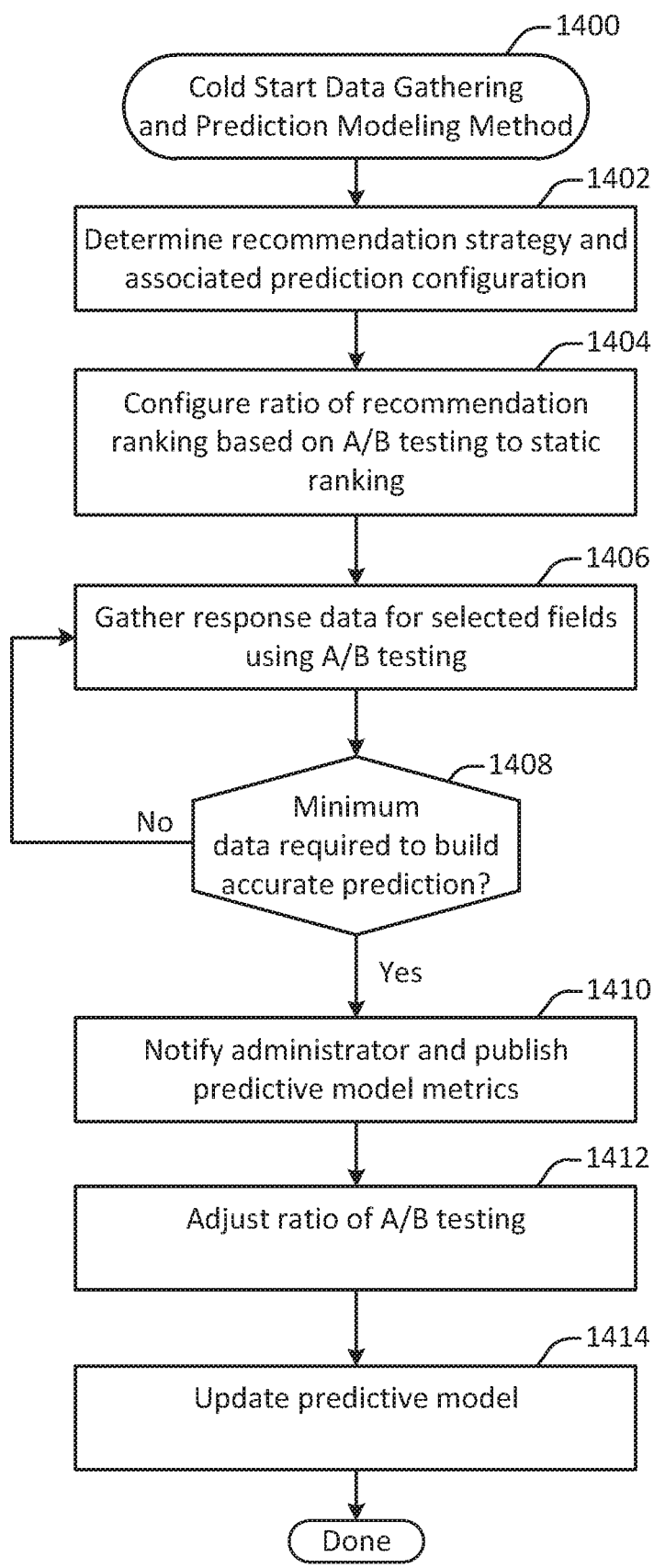
FIG. 14 shows an example method for cold start data gathering and prediction modeling, performed in accordance with one or more embodiments.
Figure 15:
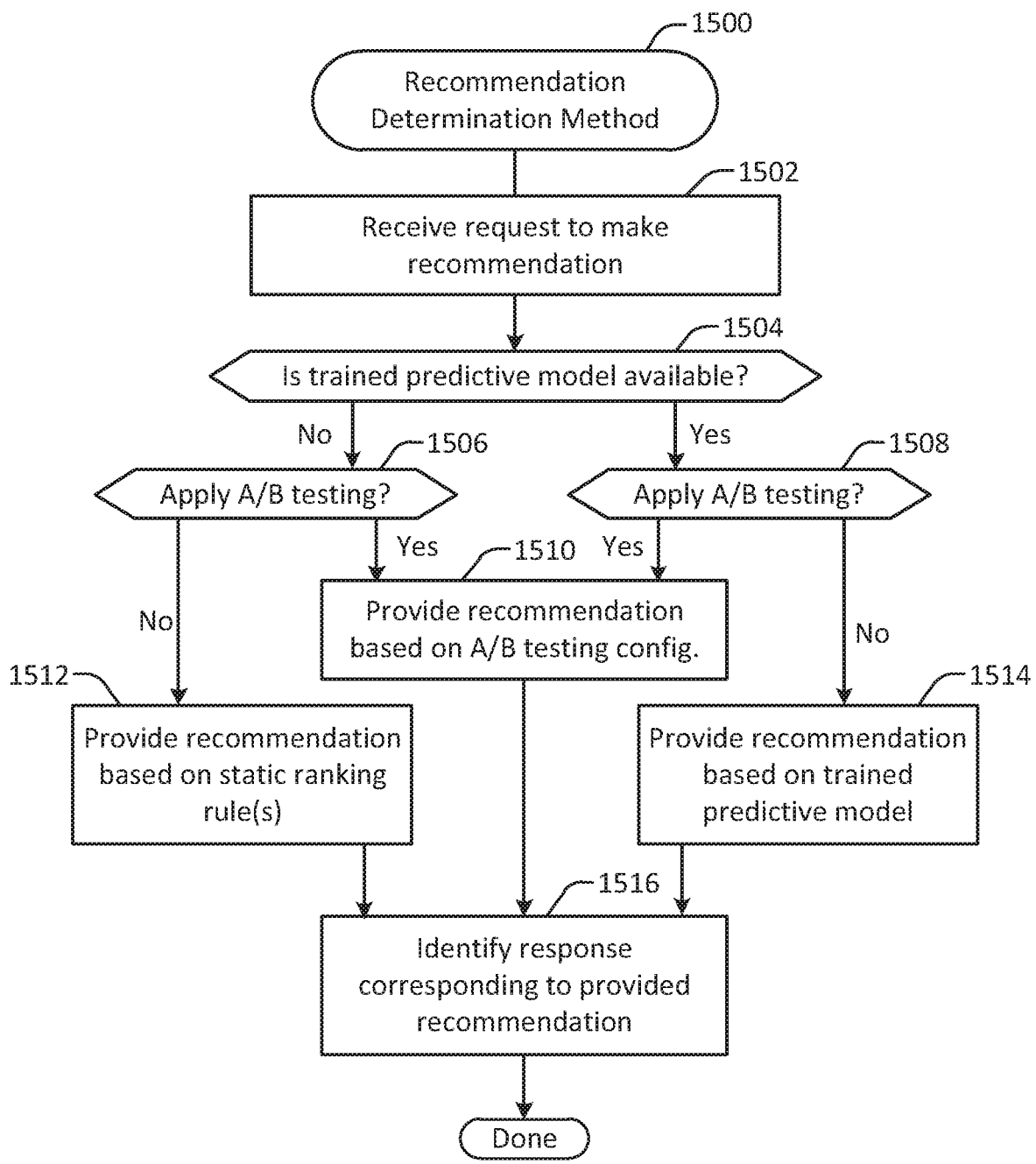
FIG. 15 shows an example method for determining recommendations for offers, performed in accordance with one or more embodiments.

Training mode 1310 and prediction mode 1320 are further described in the context of FIG. 14 and FIG. 15. FIG. 14 shows an example method 1400 for cold start data gathering and prediction modeling, in accordance with one or more embodiments. At 1402, a recommendation strategy is determined and associated with a prediction configuration, as previously described with reference to methods 300 and 800.

At 1404, a ratio of recommendation ranking based on A/B testing to static ranking is configured. As shown in FIG. 13, in training mode 1310, the prediction configuration may be configured to perform A/B testing 1312 for a predetermined percentage of target object instances relative to static ranking 1314. For example, the user may set recommendations to be provided by A/B testing 70% of the time and by static ranking 1314 for 30% of the time. Under static ranking 1314, recommendations are provided based on the specified operations in the recommendation strategy and the associated prediction operation is ignored.

In some embodiments, under A/B testing 1312 loaded recommendations may be provided based on various other considerations alternatively and/or additionally to static ranking or other business rules. For example, loaded recommendations may be selected at random regardless of business rules, such as branch merge operations. However, A/B testing may also be implemented with business rules, such that only available recommendation branches are selected from randomly. In some embodiments, one or more of the most popular loaded recommendations may be selected during A/B testing 1312. The popularity of recommendations may be determined by various factors. For example, business or sales data may indicate which offers or products were redeemed or purchased the most by customers in a given period of time. In some embodiments, a recommendation may be randomly selected from a group of the most popular recommendations.

In some embodiments, A/B testing may select recommendations based on associated response data volumes. For example, a loaded recommendation with the least amount of response data may be selected under A/B testing. As another example, A/B testing may randomly select from recommendations with response data amounts beneath a threshold level. In some embodiments, relative response data volume is taken into account. For example, A/B testing may randomly select from a predetermined amount of recommendations with the lowest response data volume.

In some embodiments, while A/B testing may provide relatively less targeted recommendations, the procedure can ensure that response data is gathered for all loaded recommendations, while adhering to basic consumer and business considerations particularly when used in conjunction with other business rules and filters.

At 1406, response data for selected object fields is gathered for recommendations provided via A/B testing and static ranking in training mode 1310. At this point, response data for recommendations provided using static ranking may also be gathered. The selected object fields and object features for response data may be determined during the configuration of prediction configuration as previously described with reference to FIGS. 3-7. Response data may be stored in feature database 250 or other database associated with the prediction engine.

At 1408, it is determined whether there is a minimum amount of response data to build accurate predictions. If data threshold 1352 has not been met, then method 1400 returns to 1406 to continue gathering additional response data by implementing A/B testing and static ranking in training mode 1310 to update and refine the prediction model.

In some implementations, if data threshold 1352 has been reached, the administrator is notified and metrics of the predictive model are published at 1410. The recommendation prediction system may then begin operating in prediction mode 1320 to begin scoring recommendations where applicable in the recommendation strategy. Furthermore, the ratio of A/B testing is adjusted for the prediction mode at 1412. In prediction mode 1320, additional A/B testing may be performed in order to maintain sufficient response data for all loaded recommendations and prevent any one recommendation from being overrepresented in the database.

In some embodiments, as shown in FIG. 13, in prediction mode 1320, the ratio of A/B testing 1322 relative to prediction scoring 1324 is reduced in comparison to the percentage of A/B testing 1312 relative to static ranking 1314 in training mode 1310. For example, the user may specify the prediction configuration to perform A/B testing for 10% of the target object instances. However, in some embodiments, the percentage of A/B testing may remain the same or increase in the prediction mode.

At 1414, the predictive model is dynamically updated by response data for recommendations made in prediction mode 1320. As response data is gathered for recommendations made in the prediction mode, the response data volume increases, allowing the prediction model to be further updated and refined.

According to various embodiments, the described systems and methods are able to bootstrap businesses with little or no historic data by leveraging a combination of business rules and randomization techniques, enabling such businesses to deploy the described recommendation strategies and associated prediction configurations while collecting more response data that will dynamically update and improve the generated prediction models. As response data is collected for a prediction configuration, the prediction model may be rebuilt to reflect the insights learned from responses. Model retraining frequency may be predetermined and may depend on the rate at which responses are collected. For example, a prediction model may be configured for retraining with updated information stored in the feature database every business quarter. As another example, the prediction model may be updated once a certain amount of additional response data is received. In certain embodiments, the prediction model is updated in real-time or near real-time as response data is received.

FIG. 15 shows an example method 1500 for determining recommendations for offers, in accordance with one or more embodiments. At 1502 a request to make a recommendation is received. In various embodiments, the request may be generated by various means. In some embodiments, the request may be made by a representative, such as a customer service representative. For example, such request may be generated upon accessing a customer profile by a customer service representative. As another example, such request may be generated when a customer logs into an account on a mobile application or website.

At 1504, method 1500 determines whether a trained predictive model is available. If the data threshold has not been met, the prediction engine operates in the training mode and proceeds to 1506 to determine whether to apply A/B testing according to the training mode configuration. However, if data threshold has been met and an accurate prediction model is available, then the prediction engine operates in the prediction mode and proceeds to 1508 to determine whether to apply A/B testing according to the prediction mode configuration.

In some implementations, the prediction configuration may specify different rates of A/B testing for the training mode and the prediction mode. In the training mode, if it is determined to provide a recommendation based on A/B testing at 1506, method 1500 continues to 1510 to provide a recommendation based on the corresponding A/B testing configuration. The recommendation may be presented to a corresponding contact or other target object, and the response is identified at 1516. The response data and corresponding object features may then be stored and used to update the predictive model. Alternatively, if A/B testing is not to be implemented in the training mode at 1506, a recommendation is provided based on static ranking rules at 1512. The recommendation may be presented to a corresponding contact or other target object instance, and the response is identified at 1516.

In the prediction mode, if it is determined to provide a recommendation based on the corresponding A/B testing at 1508, method 1500 continues to 1510 to provide a recommendation based on the corresponding A/B testing configuration. According to various embodiments, the recommendation may be presented to a corresponding contact or other target object instance, and the response is identified at 1516. Alternatively, if A/B testing is not to be implemented in the prediction mode at 1508, a recommendation is provided based on the trained predictive model at 1514. The recommendation may be presented to a corresponding contact or other target object instance, and the response is identified at 1516.

Figure 16:
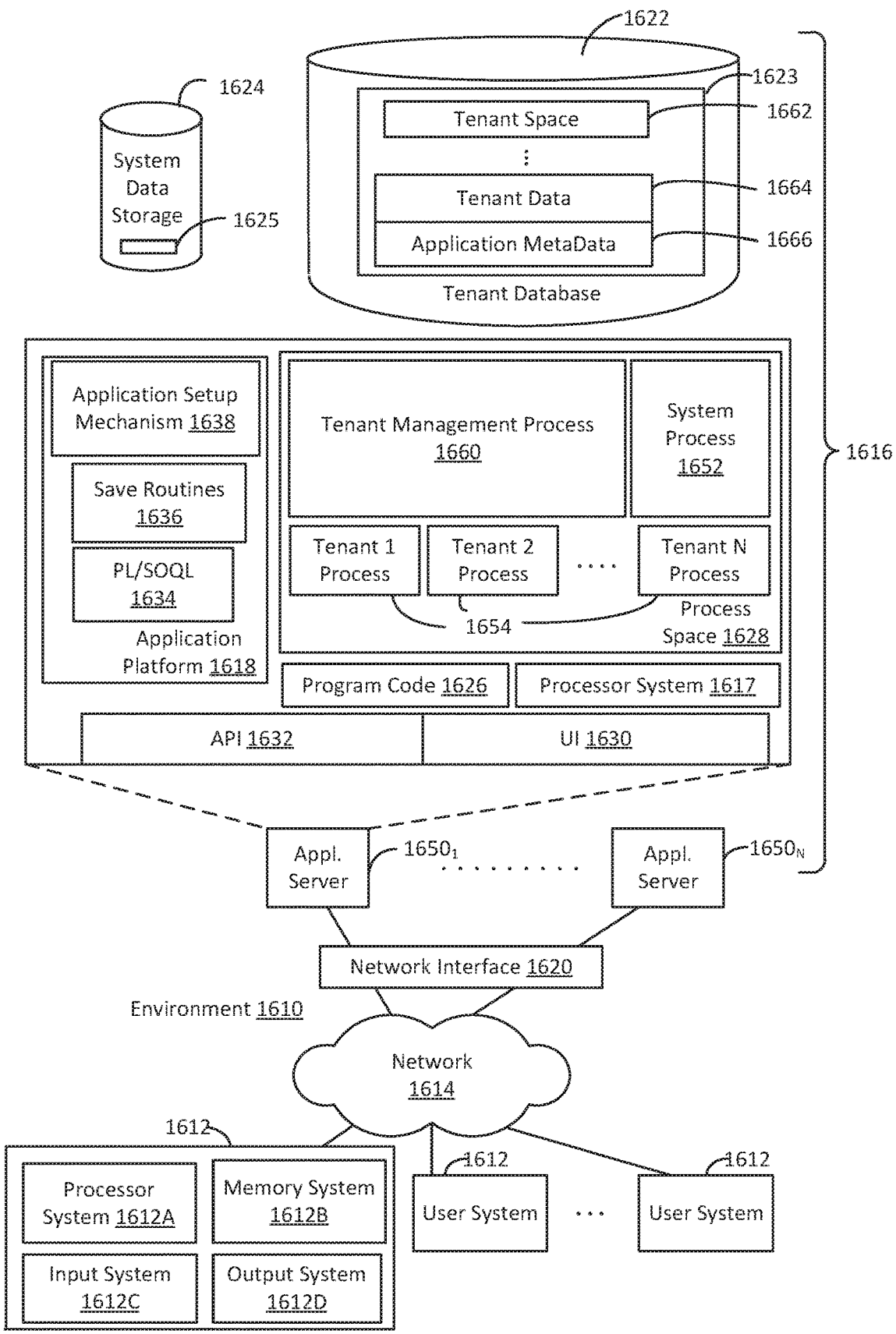
FIG. 16 shows a block diagram of an example of an environment that includes an on-demand database service configured in accordance with some implementations.

FIG. 16 shows a block diagram of an example of an environment 1610 that includes an on-demand database service configured in accordance with some implementations. Environment 1610 may include user systems 1612, network 1614, database system 1616, processor system 1617, application platform 1618, network interface 1620, tenant data storage 1622, tenant data 1623, system data storage 1624, system data 1625, program code 1626, process space 1628, User Interface (UI) 1630, Application Program Interface (API) 1632, PL/SOQL 1634, save routines 1636, application setup mechanism 1638, application servers 1650-1 through 1650-N, system process space 1652, tenant process spaces 1654, tenant management process space 1660, tenant storage space 1662, user storage 1664, and application metadata 1666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 1616. Such applications may be developed by the database service provider or by users or third-party application developers accessing the service. Application platform 1618 includes an application setup mechanism 1638 that supports application developers' creation and management of applications, which may be saved as metadata into tenant data storage 1622 by save routines 1636 for execution by subscribers as one or more tenant process spaces 1654 managed by tenant management process 1660 for example. Invocations to such applications may be coded using PL/SOQL 1634 that provides a programming language style interface extension to API 1632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1666 for a subscriber making such an invocation. Such system processes may also manage execution of application metadata 1666 as an application in a virtual machine.

In some implementations, each application server 1650 may handle requests for any user associated with any organization. A load balancing function (e.g., an F5 Big-IP load balancer) may distribute requests to the application servers 1650 based on an algorithm such as least-connections, round robin, observed response time, etc. Each application server 1650 may be configured to communicate with tenant data storage 1622 and the tenant data 1623 therein, and system data storage 1624 and the system data 1625 therein to serve requests of user systems 1612. The tenant data 1623 may be divided into individual tenant storage spaces 1662, which can be either a physical arrangement and/or a logical arrangement of data. Within each tenant storage space 1662, user storage 1664 and application metadata 1666 may be similarly allocated for each user. For example, a copy of a user's most recently used (MRU) items might be stored to user storage 1664. Similarly, a copy of MRU items for an entire tenant organization may be stored to tenant storage space 1662. A UI 1630 provides a user interface and an API 1632 provides an application programming interface to system 1616 resident processes to users and/or developers at user systems 1612.

System 1616 may implement a web-based learning platform and/or application or service. For example, in some implementations, system 1616 may include application servers configured to implement and execute software applications related to the learning platform and/or the application or service. The application servers may be configured to provide related data, code, forms, web pages and other information to and from user systems 1612. Additionally, the application servers may be configured to store information to, and retrieve information from a database system. Such information may include related data, objects, and/or Webpage content. With a multi-tenant system, data for multiple tenants may be stored in the same physical database object in tenant data storage 1622, however, tenant data may be arranged in the storage medium(s) of tenant data storage 1622 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 1612 may include processor system 1612A, memory system 16126, input system 1612C, and output system 7 12D. A user system 1612 may be implemented as any computing device(s) or other data processing apparatus such as a mobile phone, laptop computer, tablet, desktop computer, or network of computing devices. User system 12 may run an Internet browser allowing a user (e.g., a subscriber of an MTS) of user system 1612 to access, process and view information, pages and applications available from system 1616 over network 1614. Network 1614 may be any network or combination of networks of devices that communicate with one another, such as any one or any combination of a LAN (local area network), WAN (wide area network), wireless network, or other appropriate configuration.

The users of user systems 1612 may differ in their respective capacities, and the capacity of a particular user system 1612 to access information may be determined at least in part by "permissions" of the the particular user system 1612. As discussed herein, permissions generally govern access to computing resources such as data objects, components, and other entities of a computing system, such as a learning platform, a social networking system, a CRM database system, and/or any other type of application or service. "Permission sets" generally refer to groups of permissions that may be assigned to users of such a computing environment. For instance, the assignments of users and permission sets may be stored in one or more databases of System 1616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1616 may provide on-demand database service to user systems 1612 using an MTS arrangement. By way of example, one tenant organization may be a company that employs a sales force where each salesperson uses system 1616 to manage their sales process. Thus, a user in such an organization may maintain contact data, leads data, customer follow-up data, performance data, goals and progress data, etc., all applicable to that user's personal sales process (e.g., in tenant data storage 1622). In this arrangement, a user may manage his or her sales efforts and cycles from a variety of devices, since relevant data and applications to interact with (e.g., access, view, modify, report, transmit, calculate, etc.) such data may be maintained and accessed by any user system 1612 having network access.

When implemented in an MIS arrangement, system 1616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1616 may also maintain system-level data usable by multiple tenants or other data. Such system-level data may include industry reports, news, postings, and the like that are sharable between tenant organizations.

In some implementations, user systems 1612 may be client systems communicating with application servers 1650 to request and update system-level and tenant-level data from system 1616. By way of example, user systems 1612 may send one or more queries requesting data of a database maintained in tenant data storage 1622 and/or system data storage 1624. An application server 1650 of system 1616 may automatically generate one or more SQL statements (e.g., one or more SQL queries) that are designed to access the requested data. System data storage 1624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 17A:
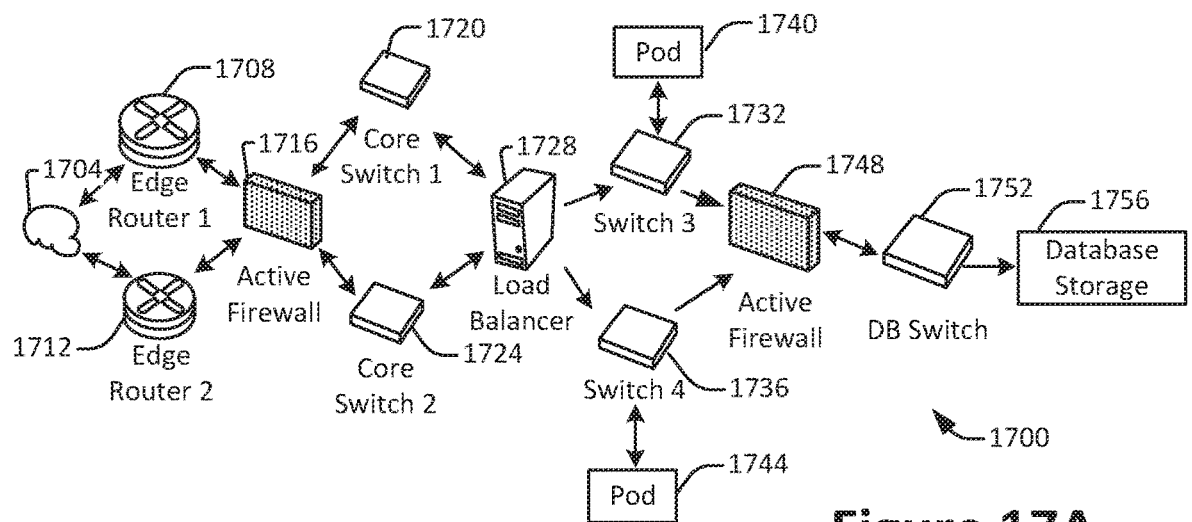
FIG. 17A shows a system diagram of an example of architectural components of an on-demand database service environment, configured in accordance with some implementations.

FIG. 17A shows a system diagram of an example of architectural components of an on-demand database service environment 1700, configured in accordance with some implementations. A client machine located in the cloud 1704 may communicate with the on-demand database service environment via one or more edge routers 1708 and 1712. A client machine may include any of the examples of user systems 1612 described above. The edge routers 1708 and 1712 may communicate with one or more core switches 1720 and 1724 via firewall 1716. The core switches may communicate with a load balancer 1728, which may distribute server load over different pods, such as the pods 1740 and 1744 by communication via pod switches 1732 and 1736. The pods 1740 and 1744, which may each include one or more servers and/or other computing resources, may perform data processing and other operations used to provide on-demand services. Components of the environment may communicate with a database storage 1756 via a database firewall 1748 and a database switch 1752.

Accessing an on-demand database service environment may involve communications transmitted among a variety of different components. The environment 1700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 17A and 17B.

The cloud 1704 refers to any suitable data network or combination of data networks, which may include the Internet. Client machines located in the cloud 1704 may communicate with the on-demand database service environment 1700 to access services provided by the on-demand database service environment 1700. By way of example, client machines may access the on-demand database service environment 1700 to retrieve, store, edit, and/or process a variety of information such as learning content from a learning platform or data from an application or service such as a CRM platform.

In some implementations, the edge routers 1708 and 1712 route packets between the cloud 1704 and other components of the on-demand database service environment 1700. The edge routers 1708 and 1712 may employ the Border Gateway Protocol (BGP). The edge routers 1708 and 1712 may maintain a table of IP networks or 'prefixes', which designate network reachability among autonomous systems on the Internet.

In one or more implementations, the firewall 1716 may protect the inner components of the environment 1700 from Internet traffic. The firewall 1716 may block, permit, or deny access to the inner components of the on-demand database service environment 1700 based upon a set of rules and/or other criteria. The firewall 1716 may act as one or more of a packet filter, an application gateway, a stateful filter, a proxy server, or any other type of firewall.

In some implementations, the core switches 1720 and 1724 may be high-capacity switches that transfer packets within the environment 1700. The core switches 1720 and 1724 may be configured as network bridges that quickly route data between different components within the on-demand database service environment. The use of two or more core switches 1720 and 1724 may provide redundancy and/or reduced latency.

In some implementations, communication between the pods 1740 and 1744 may be conducted via the pod switches 1732 and 1736. The pod switches 1732 and 1736 may facilitate communication between the pods 1740 and 1744 and client machines, for example via core switches 1720 and 1724. Also or alternatively, the pod switches 1732 and 1736 may facilitate communication between the pods 1740 and 1744 and the database storage 1756. The load balancer 1728 may distribute workload between the pods, which may assist in improving the use of resources, increasing throughput, reducing response times, and/or reducing overhead. The load balancer 1728 may include multilayer switches to analyze and forward traffic.

In some implementations, access to the database storage 1756 may be guarded by a database firewall 1748, which may act as a computer application firewall operating at the database application layer of a protocol stack. The database firewall 1748 may protect the database storage 1756 from application attacks such as structure query language (SQL) injection, database rootkits, and unauthorized information disclosure. The database firewall 1748 may include a host using one or more forms of reverse proxy services to proxy traffic before passing it to a gateway router and/or may inspect the contents of database traffic and block certain content or database requests. The database firewall 1748 may work on the SQL application level atop the TCP/IP stack, managing applications' connection to the database or SQL management interfaces as well as intercepting and enforcing packets traveling to or from a database network or application interface.

In some implementations, the database storage 1756 may be an on-demand database system shared by many different organizations. The on-demand database service may employ a single-tenant approach, a multi-tenant approach, a virtualized approach, or any other type of database approach. Communication with the database storage 1756 may be conducted via the database switch 1752. The database storage 1756 may include various software components for handling database queries. Accordingly, the database switch 1752 may direct database queries transmitted by other components of the environment (e.g., the pods 1740 and 1744) to the correct components within the database storage 1756.

Figure 17B:
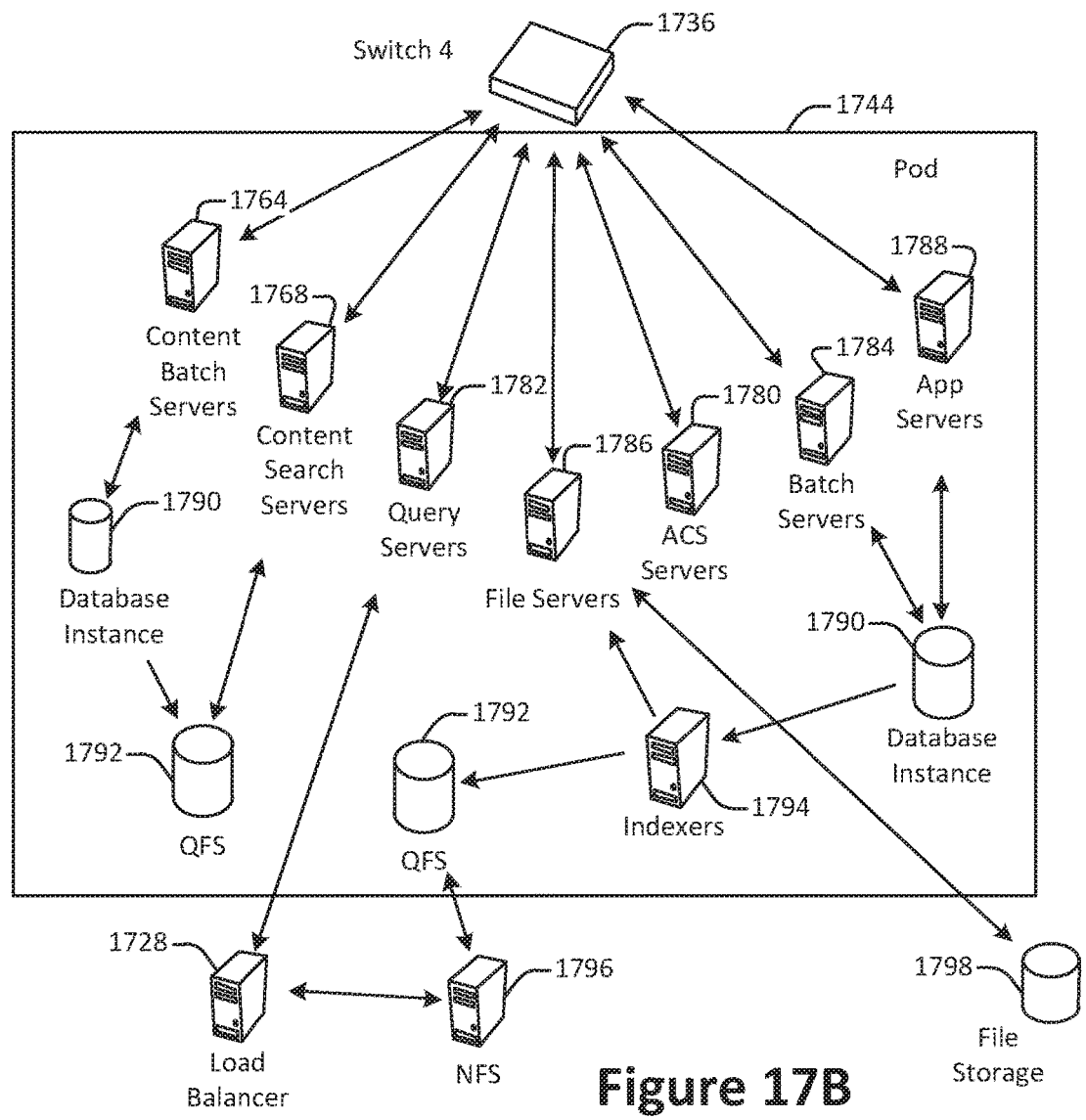
FIG. 17B shows a system diagram further illustrating an example of architectural components of an on-demand database service environment, configured in accordance with some implementations.

FIG. 17B shows a system diagram further illustrating an example of architectural components of an on-demand database service environment, in accordance with some implementations. The pod 1744 may be used to render services to user(s) of the on-demand database service environment 1700. The pod 1744 may include one or more content batch servers 1764, content search servers 1768, query servers 1782, file servers 1786, access control system (ACS) servers 1780, batch servers 1784, and app servers 1788. Also, the pod 1744 may include database instances 1790, quick file systems (QFS) 1792, and indexers 1794. Some or all communication between the servers in the pod 1744 may be transmitted via the switch 1736.

In some implementations, the app servers 1788 may include a framework dedicated to the execution of procedures (e.g., programs, routines, scripts) for supporting the construction of applications provided by the on-demand database service environment 1700 via the pod 1744. One or more instances of the app server 1788 may be configured to execute all or a portion of the operations of the services described herein.

In some implementations, as discussed above, the pod 1744 may include one or more database instances 1790. A database instance 1790 may be configured as an MTS in which different organizations share access to the same database, using the techniques described above. Database information may be transmitted to the indexer 1794, which may provide an index of information available in the database 1790 to file servers 1786. The QFS 1792 or other suitable filesystem may serve as a rapid-access file system for storing and accessing information available within the pod 1744. The QFS 1792 may support volume management capabilities, allowing many disks to be grouped together into a file system. The QFS 1792 may communicate with the database instances 1790, content search servers 1768 and/or indexers 1794 to identify, retrieve, move, and/or update data stored in the network file systems (NFS) 1796 and/or other storage systems.

In some implementations, one or more query servers 1782 may communicate with the NFS 1796 to retrieve and/or update information stored outside of the pod 1744. The NFS 1796 may allow servers located in the pod 1744 to access information over a network in a manner similar to how local storage is accessed. Queries from the query servers 1722 may be transmitted to the NFS 1796 via the load balancer 1728, which may distribute resource requests over various resources available in the on-demand database service environment 1700. The NFS 1796 may also communicate with the QFS 1792 to update the information stored on the NFS 1796 and/or to provide information to the QFS 1792 for use by servers located within the pod 1744.

In some implementations, the content batch servers 1764 may handle requests internal to the pod 1744. These requests may be long-running and/or not tied to a particular customer, such as requests related to log mining, cleanup work, and maintenance tasks. The content search servers 1768 may provide query and indexer functions such as functions allowing users to search through content stored in the on-demand database service environment 1700. The file servers 1786 may manage requests for information stored in the file storage 1798, which may store information such as documents, images, basic large objects (BLOBs), etc. The query servers 1782 may be used to retrieve information from one or more file systems. For example, the query system 1782 may receive requests for information from the app servers 1788 and then transmit information queries to the NFS 1796 located outside the pod 1744. The ACS servers 1780 may control access to data, hardware resources, or software resources called upon to render services provided by the pod 1744. The batch servers 1784 may process batch jobs, which are used to run tasks at specified times. Thus, the batch servers 1784 may transmit instructions to other servers, such as the app servers 1788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 18:
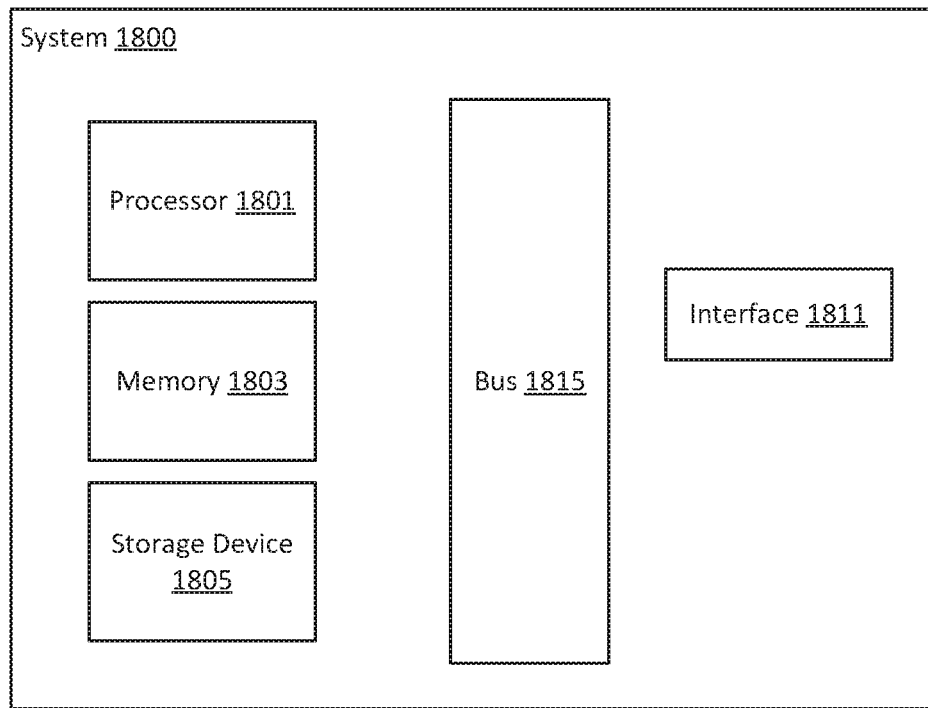
FIG. 18 illustrates one example of a computing device, configured in accordance with one or more embodiments.

FIG. 18 illustrates one example of a computing device. According to various embodiments, a system 1800 suitable for implementing embodiments described herein includes a processor 1801, a memory module 1803, a storage device 1805, an interface 1811, and a bus 1815 (e.g., a PCI bus or other interconnection fabric.) System 1800 may operate as variety of devices such as an application server, a database server, or any other device or service described herein. Although a particular configuration is described, a variety of alternative configurations are possible. The processor 1801 may perform operations such as those described herein. Instructions for performing such operations may be embodied in the memory 1803, on one or more non-transitory computer readable media, or on some other storage device. Various specially configured devices can also be used in place of or in addition to the processor 1801. The interface 1811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
    determining via a processor whether a prediction model for an object definition is associated with sufficient training data to produce predictions at a designated accuracy rate, the prediction model predicting for a given object instance of the object definition a respective probability of acceptance for each of a plurality of recommendations;
when it is determined that the prediction model is not associated with sufficient training data, transmitting via a communication interface for each of a first set of object instances a respective first message that includes a respective first one of the recommendations, the respective first one of the recommendations determined based on a static ranking rule, the static ranking rule applying one or more criteria to one or more object fields associated with the respective object instance; and
updating the prediction model to include additional training data based on a plurality of responses, each response corresponding to a respective first one of the recommendations.

2. The method as recited in claim 1, wherein the probability of acceptance is modeled as a propensity score.

3. The method as recited in claim 1, the method further comprising:
for each of a second set of object instances, transmitting via the communications interface a respective second message that includes a respective second one of the recommendations selected at random from a respective subset of the recommendations.

4. The method as recited in claim 3, further comprising:
updating the prediction model to include additional training data based on a plurality of responses, each response corresponding to a respective second one of the recommendations.

5. The method as recited in claim 3, wherein each of the respective second one of the recommendations meets the one or more criteria associated with the respective object instance with which it is associated.

6. The method as recited in claim 3, wherein a designated proportion specifies a relative size of the first set of object instances as compared to the second set of object instances.

7. The method as recited in claim 1, the method further comprising:
for each of a second set of object instances, transmitting via the communications interface a respective second message that includes a respective second one of the recommendations selected from a respective subset of the recommendations, the respective second one of the recommendations meeting a designated popularity threshold.

8. The method as recited claim 1, wherein the respective object instance is a contact associated with an account, and wherein the respective first message is transmitted to a client device corresponding to the contact for display within an application executed on the client device.

9. The method as recited in claim 1, wherein a notification message is transmitted indicating that the prediction model is available when the prediction model has been updated to include sufficient training data, wherein the notification message includes prediction accuracy metrics of the prediction model.

10. The method as recited in claim 1, wherein each response of the plurality of responses includes at least one object field associated with the respective recommendation.

11. A database system implemented using a server system, the database system configurable to cause:
determining via a processor whether a prediction model for an object definition is associated with sufficient training data to produce predictions at a designated accuracy rate, the prediction model predicting for a given object instance of the object definition a respective probability of acceptance for each of a plurality of recommendations;
when it is determined that the prediction model is not associated with sufficient training data, transmitting via a communication interface for each of a first set of object instances a respective first message that includes a respective first one of the recommendations, the respective first one of the recommendations determined based on a static ranking rule, the static ranking rule applying one or more criteria to one or more object fields associated with the respective object instance; and
updating the prediction model to include additional training data based on a plurality of responses, each response corresponding to a respective first one of the recommendations.

12. The database system as recited in claim 11, wherein the probability of acceptance is modeled as a propensity score.

13. The database system as recited in claim 11, wherein the database system is further configurable to cause:
for each of a second set of object instances, transmitting via the communications interface a respective second message that includes a respective second one of the recommendations selected at random from a respective subset of the recommendations.

14. The database system as recited in claim 11, wherein the database system is further configurable to cause:
updating the prediction model to include additional training data based on a plurality of responses, each response corresponding to a respective second one of the recommendations.

15. The database system as recited in claim 11, wherein the respective object instance is a contact associated with an account, and wherein the respective first message is transmitted to a client device corresponding to the contact for display within an application executed on the client device.

16. The database system as recited in claim 11, wherein a notification message is transmitted indicating that the prediction model is available when the prediction model has been updated to include sufficient training data, wherein the notification message includes prediction accuracy metrics of the prediction model.

17. A computer program product comprising computer-readable program code capable of being executed by one or more processors when retrieved from a non-transitory computer-readable medium, the program code comprising instructions configurable to cause:
determining via a processor whether a prediction model for an object definition is associated with sufficient training data to produce predictions at a designated accuracy rate, the prediction model predicting for a given object instance of the object definition a respective probability of acceptance for each of a plurality of recommendations;
when it is determined that the prediction model is not associated with sufficient training data, transmitting via a communication interface for each of a first set of object instances a respective first message that includes a respective first one of the recommendations, the respective first one of the recommendations determined based on a static ranking rule, the static ranking rule applying one or more criteria to one or more object fields associated with the respective object instance; and updating the prediction model to include additional training data based on a plurality of responses, each response corresponding to a respective first one of the recommendations.

18. The computer program product as recited in claim 17, the program code further comprising instructions configurable to cause:

for each of a second set of object instances, transmitting via the communications interface a respective second message that includes a respective second one of the recommendations selected from a respective subset of the recommendations, the respective second one of the recommendations meeting a designated popularity threshold.

19. The computer program product as recited in claim 17, wherein a notification message is transmitted indicating that the prediction model is available when the prediction model has been updated to include sufficient training data, wherein the notification message includes prediction accuracy metrics of the prediction model.

20. The computer program product as recited in claim 17, wherein each response of the plurality of responses includes at least one object field associated with the respective recommendation.

* * * * *